US012333394B2

(12) United States Patent
Luo et al.

(10) Patent No.: US 12,333,394 B2
(45) Date of Patent: Jun. 17, 2025

(54) PRIVACY-PRESERVING LABELING AND CLASSIFICATION OF EMAIL

(71) Applicant: MICROSOFT TECHNOLOGY LICENSING, LLC, Redmond, WA (US)

(72) Inventors: Yi Luo, Redmond, WA (US); Weigsheng Li, Redmond, WA (US); Sharada Shirish Acharya, Seattle, WA (US); Mainak Sen, Palo Alto, CA (US); Ravi Kiran Reddy Poluri, Redmond, WA (US); Christian Rudnick, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/051,217

(22) Filed: Oct. 31, 2022

(65) Prior Publication Data

US 2023/0077990 A1    Mar. 16, 2023

Related U.S. Application Data

(62) Division of application No. 16/049,579, filed on Jul. 30, 2018, now Pat. No. 11,521,108.

(51) Int. Cl.
*G06N 20/00* (2019.01)
*H04L 51/42* (2022.01)

(52) U.S. Cl.
CPC ............. *G06N 20/00* (2019.01); *H04L 51/42* (2022.05)

(58) Field of Classification Search
CPC ................................ G06N 20/00; H04L 51/42
See application file for complete search history.

(56) References Cited

U.S. PATENT DOCUMENTS

| 7,051,077 | B2 * | 5/2006 | Lin ..................... H04L 51/212 |
| | | | 709/207 |
| 9,946,789 | B1 * | 4/2018 | Li ........................... G06F 16/93 |
| 10,216,933 | B1 * | 2/2019 | Curtin ..................... G06N 20/00 |
| 10,489,587 | B1 * | 11/2019 | Kennedy ................. G06N 5/045 |

(Continued)

FOREIGN PATENT DOCUMENTS

CN     104054103 A     9/2014

OTHER PUBLICATIONS

"Office Action Issued in Indian Patent Application No. 202047055893", Mailed Date: Nov. 30, 2022, 7 Pages.

(Continued)

*Primary Examiner* — Ryan C Vaughn
(74) *Attorney, Agent, or Firm* — Benjamin Keim; Newport IP, LLC

(57) ABSTRACT

Emails or other communications are labeled with a category label such as "spam" or "good" without using confidential or Personally Identifiable Information (PII). The category label is based on features of the emails such as metadata that do not contain PII. Graphs of inferred relationships between email features and category labels are used to assign labels to emails and to features of the emails. The labeled emails are used as a training dataset for training a machine learning model ("MLM"). The MLM identifies unwanted emails such as spam, bulk email, phishing email, and emails that contain malware.

19 Claims, 19 Drawing Sheets

(56) References Cited

U.S. PATENT DOCUMENTS

| | | | |
|---|---|---|---|
| 2015/0134389 A1* | 5/2015 | Punera | G06N 5/00 |
| | | | 705/7.15 |
| 2017/0032279 A1* | 2/2017 | Miserendino | G06F 21/56 |
| 2017/0228637 A1* | 8/2017 | Santoro | G06N 3/063 |

OTHER PUBLICATIONS

Office Action Received for Chinese Application No. 201980050036.1, Mailed on Dec. 28, 2023, 12 pages (English Translation Provided).

Office Action Received for Chinese Application No. 201980050036.1, mailed on Jul. 12, 2024, 4 pages. (English Translation Provided).

Intimation of Grant received for Indian Application No. 202047055893, mailed on Mar. 8, 2024, 1 page.

\* cited by examiner

PRIVACY-PRESERVING LABELING AND CLASSIFICATION OF EMAIL

CROSS-REFERENCE TO RELATED APPLICATION

This application is a divisional of U.S. patent application Ser. No. 16/049,579, filed Jul. 30, 2018, the content of which application is hereby expressly incorporated herein by reference in its entirety.

BACKGROUND

Unwanted emails and other electronic communications are a persistent issue for users of electronic communication systems. The problems caused by unwanted email can range from annoyance caused by spam and bulk email to serious harm due to phishing attacks and malware. One step in addressing the problems caused by unwanted communications is distinguishing unwanted communications from desirable communications. Many technologies have been used to identify spam, bulk email, phishing email, email containing malware, etc. However, due to the relentless adaptation of bad actors creating unwanted communications, most technologies are useful for only a limited time and in limited scenarios.

As one example, on enterprise email systems it is challenging to effectively identify and control unwanted communications while maintaining the confidentiality of the email contents and protecting Personally Identifiable Information ("PII"). Blocking spam without being able to "look inside" an email is difficult. Without access to the content of the messages it is challenging to create a system that effectively distinguishes between desired and undesired communications.

It is with respect to these and other considerations the disclosure made herein is presented.

SUMMARY

Technologies are described herein for creating a labeled, training dataset from emails without use of confidential information or PII. The training dataset is used with supervised machine learning to create a machine learning model ("MLM") that classifies emails into categories such as good email, spam email, phishing email, bulk email, and malware email. This technology is able to label individual email without access to the contents of the messages by using relationships between email features that do not include PII to determine an appropriate label to a previously unlabeled email. Some features of email messages that may be used include metadata and transmission data like sender email address, sender email host server, timestamp, type of character encoding, a hash of a universal resource locator ("URL") included in the email, and a hash of a portion of the email body.

Initial labels may come from allowlists or denylists of: email addresses, host server names, URLs, etc. and also from manually-labeled emails. The manual labels may be provided by users evaluating their own emails in order to protect privacy. Each of the email features and emails themselves may be grouped into clusters with other features/emails that are similar or identical. The term "entity" refers to both particular email features and emails themselves because either can be a basis for forming a cluster and the labels applied to either may potentially be mapped to the other. For example, the email address of a particular sender may be in its own cluster and any labels applied to that email address will be represented in the cluster. Similarly, clusters may be formed that contain multiple email messages associated with a particular label such as unsolicited bulk email ("UBE" or "spam").

This technology uses "expansion graphs" that represent inference logic based on relationships between the different types of entities that are clustered. Expansion graphs are a logical/abstract layer that captures clustering and label expansion logic. Label expansion logic indicates when a label applied to one entity may be expanded to also apply to another entity. For example, if a given sender email address has been labeled as "good" then it may be inferred that emails coming from that sender are "good" emails. However, if an email is labeled as "spam" that does not necessarily imply the host server sending the email is used only for spamming. Labels derived from expansion graphs may be associated with confidence levels. Confidence levels may be based on the source of initial labels, the number of data points, the age of the labels, etc. For example, the confidence in a label that was manually applied by a user may be much higher than the confidence in a label that comes from a set of conflicting indications (e.g., some instances indicating bulk email and some indicating a good email).

In clusters there may be different labels applied to the same entity. For example, an email address may be labeled in some instances as being a good email address, in others as being a source of spam, and yet others as being an address associated with bulk email. A single email may have come from a host email server that is associated with spam, include a sender email address that is labeled as "good," and include a URL that is labeled as "phishing." Resolving these conflicting signals for a cluster may be performed by a voting system that applies a set of voting rules to resolve the conflicts and determine which label to attach. The voting rules may include rules such as eliminating conflicting labels, keeping labels with higher confidence levels over labels with lower confidence levels, applying multiple labels if the labels do not conflict (e.g., both spam and malware labels), using more recent labels instead of older labels, ignoring minority labels, and other rules.

Clustering may also be adjusted to minimize the grouping of emails with different labels in the same cluster. One way of adjusting clusters is to change the "key" or feature on which the cluster is based to be a composite of multiple features. For example, the hash of a particular URL combined with the identity of the email host server may be used together as a basis for forming a cluster. Using a combination of multiple features to form a cluster can reduce false positives, specifically in instances in which a good email is mistakenly labeled as spam, bulk email, etc.

The labeling process is performed iteratively so after a given email has been labeled, the features from that email may be used to adjust clusters and in turn apply labels to other emails. Thus, results from past labeling can be used as the basis for future labeling. Labels may also be set to expire after a period of time. For example, if a particular URL is labeled malware, that label may be eventually removed if there has been a period of time without any new instances of the "malware" label being associated with the URL.

Once labels have been applied to a sufficient number of emails, that set of emails may be used as a training dataset for a MLM. This labeling is achieved without using any PII, and thus, is appropriate for enterprise email systems or other environments in which the confidentiality of email contents must be maintained. A process of supervised learning may be used to teach the MLM how to differentiate between different categories of email such as good email, spam email, malware email, bulk email, phishing email, and others. Thus, the MLM functions as a classifier that can classify an incoming email can as a good email, spam, or other category. Once labeled, the email may be processed according to its label such as blocking delivery of the email, placing the email into the trash, placing the email into a specified folder, etc.

Correctly identifying undesired communications can conserve resources in an email system such as bandwidth, memory, and processor cycles. Undesired communications such as spam may be deleted or never placed into long-term storage thereby reducing memory consumption. Preventing some types of emails from circulating within an email system or between different email systems reduces the usage of communications bandwidth. Additionally, emails identified as containing undesired communications can be kept on a server and not downloaded to a local computer, stored without being automatically displayed, or processed at a lower priority level only when system resources are available all of which can reduce the demand for processor cycles. Furthermore, blocking access to certain types of undesired communications such as emails that potentially contain malware increases system security by reducing the opportunities for malware to be inadvertently installed.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. Furthermore, the claimed subject matter is not limited to implementations that solve any or all disadvantages noted in any part of this disclosure. The term "technologies," for instance, may refer to system(s) and/or method(s) as permitted by the context described above and throughout the document.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1A:
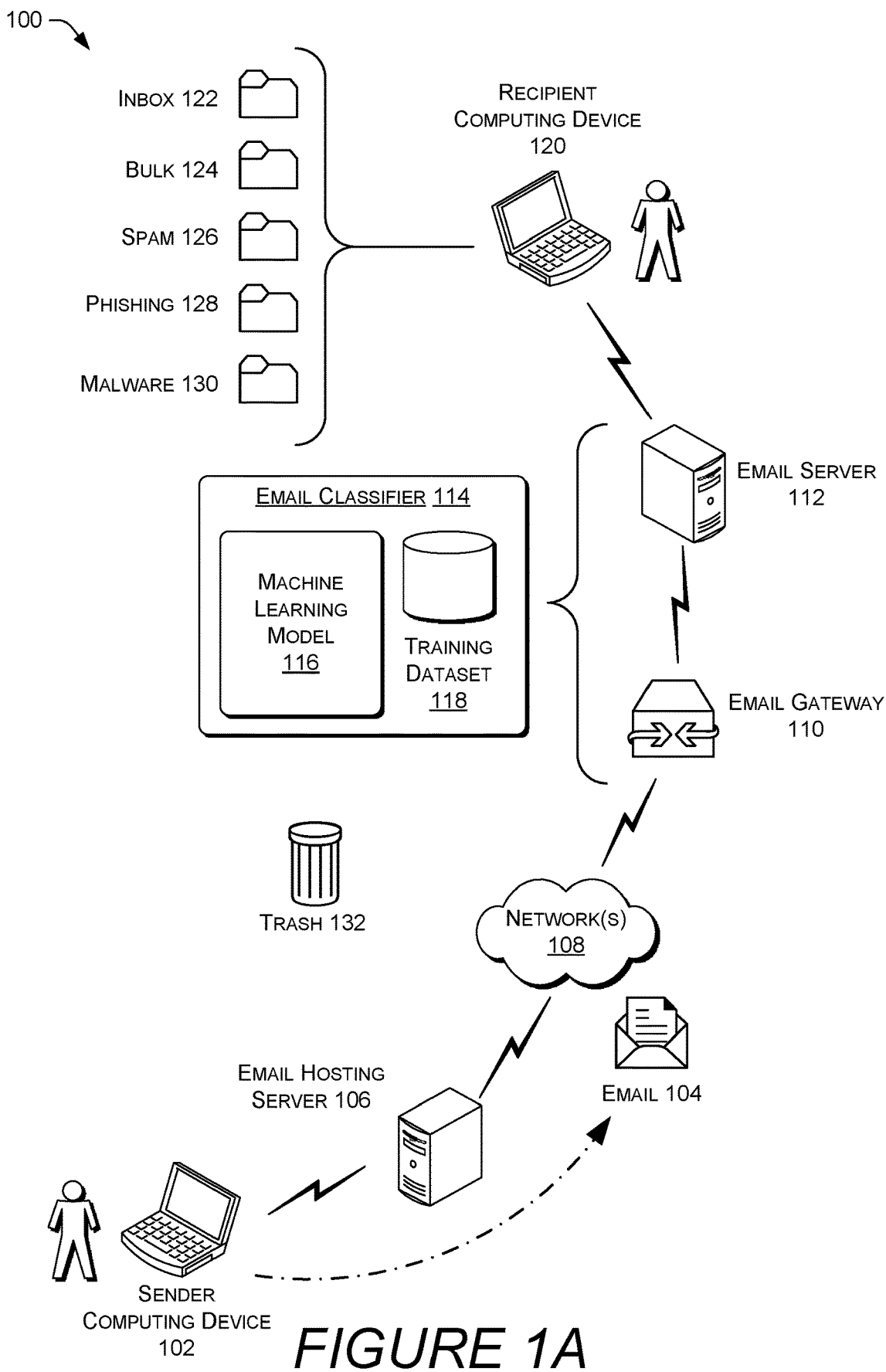
FIGS. 1A-E are a network architecture diagram illustrating an overview of a system that uses a MLM trained with a training dataset to classify an email.

A training dataset provides multiple examples of items each associated with one or more labels. The examples are used to fit parameters (e.g., weights of connections between neurons in artificial neural networks) of a model such as a MLM. This may also be referred to as "training" the MLM with the training dataset. The MLM is a model that is created by the training process. The training data contain correct answers, which are known as targets or target attributes; thus a properly labeled training dataset is important for creating a MLM. A learning algorithm finds patterns in the training dataset that map the input data attributes to the target (predictive goal e.g., spam or not spam), and it outputs an MLM that captures these patterns.

Labeling email as spam, bulk email, malware, etc. may be performed readily by human labelers. Human labelers could be people hired to review others' emails and assign labels or they could be recipients of an email that label their own emails by selecting a "spam" button, choosing to block the sender, etc. However, for labeling a large number of emails it is more efficient to use automated labeling technologies. With full access to an email the subject and body of message may be used to derive a label. However, because of confidentiality or privacy concerns the content of email messages are often unavailable for use in developing a training dataset. Thus, the technology in this disclosure provides a way to use metadata and other features of email messages to assign labels without accessing any private information or PII. PII includes information that can be used on its own or with other information to identify, contact, or locate a single person, or to identify an individual in context.

One way of obtaining a label for an email without a third-party evaluating the contents of the message is to receive labels from the email recipients themselves. While this protects confidentiality, the number of labeled emails is relatively small relative to the total volume of email, the labels are not clean (e.g., sometimes people label their email wrong), the granularity of the labels may be less than desired for building a robust model. Specifically, many self-labeling systems such as provided with email software only include the labels of "junk/spam" and "good." This binary labeling does not allow for building multi-class models that can distinguish, for example, between spam, bulk email, phishing, and malware.

Using machine learning to recognize different types of emails can provide a scalability that is not practical with human labels. However, without a comprehensive training dataset with clean labels, it is challenging to make an effective MLM. And it is challenging to create a training dataset if the contents of the emails cannot be examined due to privacy concerns.

The following disclosure and the accompanying figures describe novel systems and technologies for creating training datasets by applying labels to emails without exposing PII or confidential information. The training datasets can then be used to train MLMs for classifying emails and preventing spam and other unwanted communications from reaching a user's inbox. Although email is specifically referenced through this disclosure, the technologies and systems provided herein are equally applicable to other types of electronic messages or electronic communications such as instant messages, text messages, website posts or comments, chat groups, message boards, blog posts, social network posts, and the like. Additionally, the technologies and systems of this disclosure are equally applicable to all formats of messages such as text, audio, images, video, or other formats.

FIGS. 1A-E show an illustrative network architecture 100 that includes a sender computing device 102 which is the source of an email 104. The sender computing device 102 may be any type of computing device such as a personal computer, a server, etc. The sending computer device 102 may include "zombie" computers that are maliciously controlled by software that directs the computer to send emails without the knowledge of the true owner/user of the computer.

The email 104 (or other type of communication) may be a "good" email of the kind sent between two individuals who have an existing relationship with each other. It may be a "spam" email which is electronic junk mail that is unsolicited and often contains advertising from some product. The email 104 may be a "phishing" email which is a fraudulent email falsely claiming to be an established legitimate enterprise in an attempt to scam the user into surrendering private information that will be used for identity theft or other crime. "Bulk" email is another possibility for the email 104. Bulk email is email that is sent to large groups at once. It is typically comprised of advertising or marketing messages that are sent as mass email.

In some cases, treatment of bulk email may be different that other types of "problem" email because it could potentially be desired by the recipient. The email 104 could also be a "malware" email that contains or has a link to malicious software. Malware is any software intentionally designed to cause damage to a computer, server or computer network. Malware does the damage after it is implanted or introduced in some way into a target's computer and can take the form of executable code, scripts, active content, and other software.

Unwanted email such as the types described above is a problem not just because it is undesired by the recipient, but also because it can impact enterprise systems management by encroaching on bandwidth, storage space, and other network resources. Thus, effective identification and management of unwanted email can improve network function by making more bandwidth and storage space available for legitimate uses.

The sender computing device 102 may use an email hosting server 106 for transmitting outgoing emails. The email hosting server 106 may operate a mail transfer agent that routes and delivers email from the sender computing device 102. Examples of software that may run on an email hosting server 106 include MICROSOFT EXCHANGE SERVER and POSTFIX. The email hosting server 106 routes the email 104 across one or more network(s) 108 such as the Internet.

In some implementations an email gateway 110 may process email transmitted across the one or more network(s) 108. The email gateway 110 is the first point at which the email 104 contacts the recipient's computer system. An email server 112 may be implemented separately or combined with the email gateway 110. The email server 112 may process incoming and outgoing email for the organization or email service of the email recipient.

An email classifier 114 may be implemented on either or both of the email gateway 110 and the email server 112. The email classifier 114 classifies the email 104 and other incoming email into one of multiple categories. For example, the categories may be binary such as "good" or "bad" email or there may be more than two categories of email such as good, spam, phishing, bulk, and malware.

In machine learning, classification is the problem of identifying to which of a set of categories (sub-populations) a new observation belongs, on the basis of a training set of data containing observations (or instances) whose category membership is known. Thus, the email classifier 114 includes a MLM 116 that is created from a training dataset 118. Classification is considered an instance of supervised learning, i.e., learning where a training dataset 118 of correctly identified observations is available. The email classifier 114 does the work of identifying the type of email so that the email 104 can be processed accordingly.

A recipient computing device 120 may ultimately receive the email 104. The recipient computing device 120 may be any type of computing device that may receive email such as a personal computer, a smart phone, a smart watch, a tablet computer, a gaming console, etc. The recipient computing device 120 may include a organization schema for email messages such as a plurality of folders. Illustrative folders may include an inbox 122, bulk email folder 124, spam folder 126, phishing email folder 128, malware folder 130, etc.

FIG. 1A shows the email 104 as it is sent from the sender computing device 102 and the email hosting server 106 to the network(s) 108.

Figure 1B:
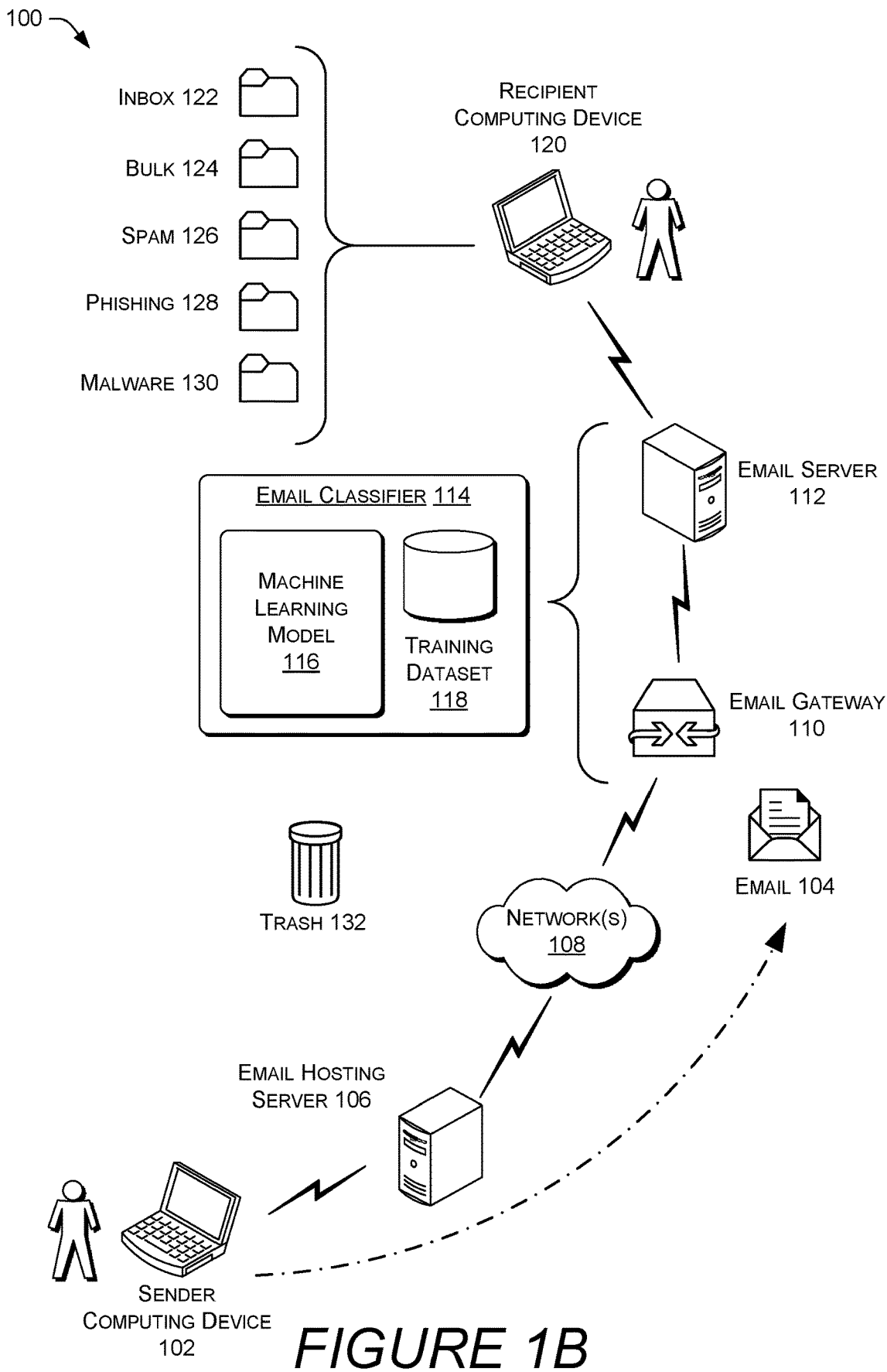

FIG. 1B shows the email 104 arriving at the email gateway 110 which may be the first opportunity for evaluation by the email classifier 114.

Figure 1C:
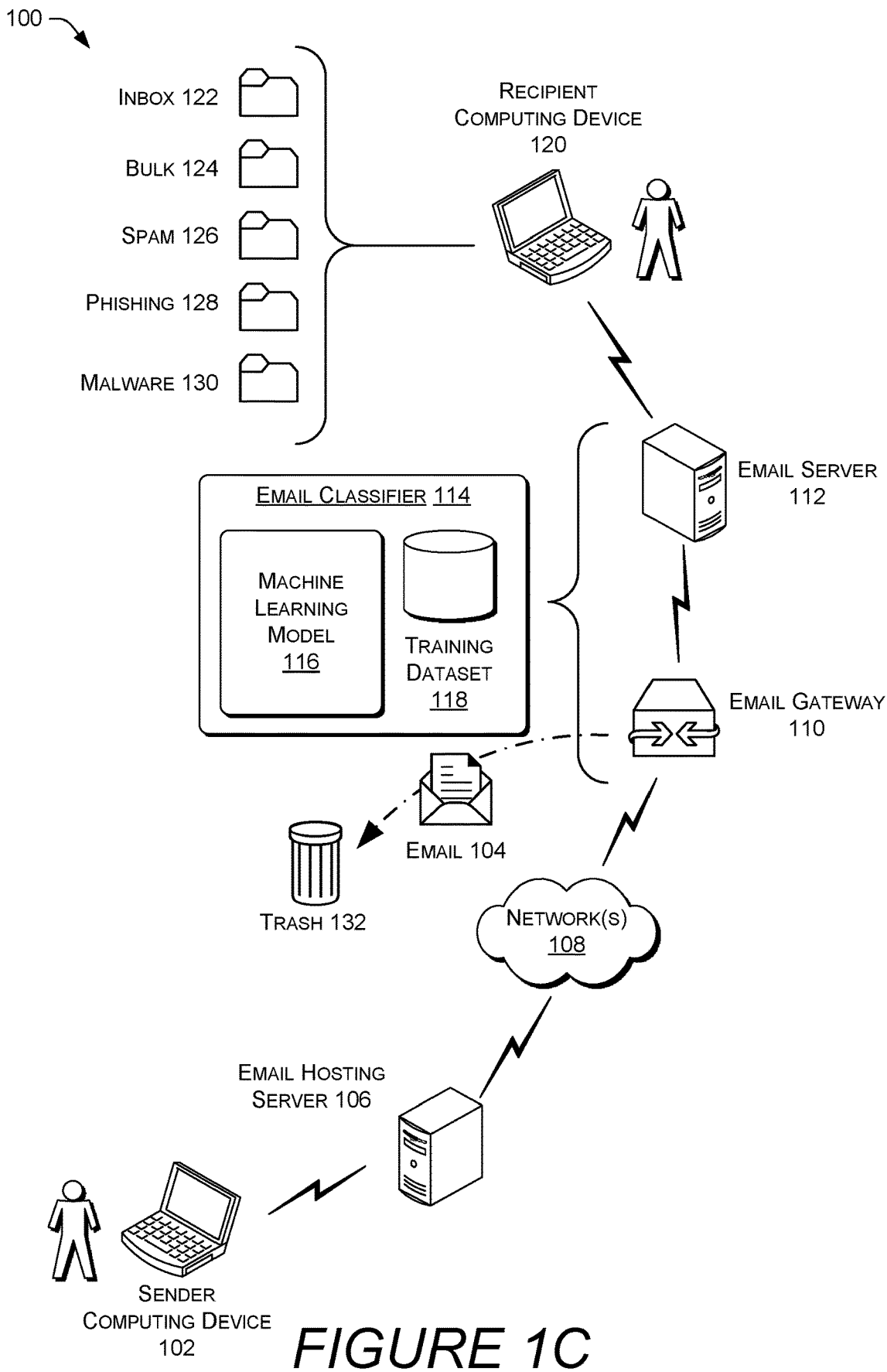

FIG. 1C shows rejection of the email 104 by the email gateway 110 and delivery of the email 104 to the trash 132. Delivery to the trash 132 may represent the email gateway 110 rejecting the email and refusing delivery and/or placing the email 104 into a storage location for deletion. The email gateway 110 may send the email 104 to the trash 132 based on a determination by the email classifier 114. For example, if the email classifier 114 classifies the email 104 as a malware email, the email gateway 110 may send the email 104 to the trash 132 in part to prevent a user from inadvertently installing the malware. Sending the 104 directly to the trash 132 may be based on a confidence level in the classification provided by the email classifier 114. For example, if the confidence level for the malware classification is above a threshold confidence level then the email 104 will be moved to the trash 132.

Blocking spam and other undesired emails at the email gateway 110 can save network resources such as bandwidth, storage, and processor cycles because the devices downstream from the email gateway 110 do not interact with the undesired emails. This can improve the functioning of the email server 112, the recipient computing device 120, and other computer systems.

Figure 1D:
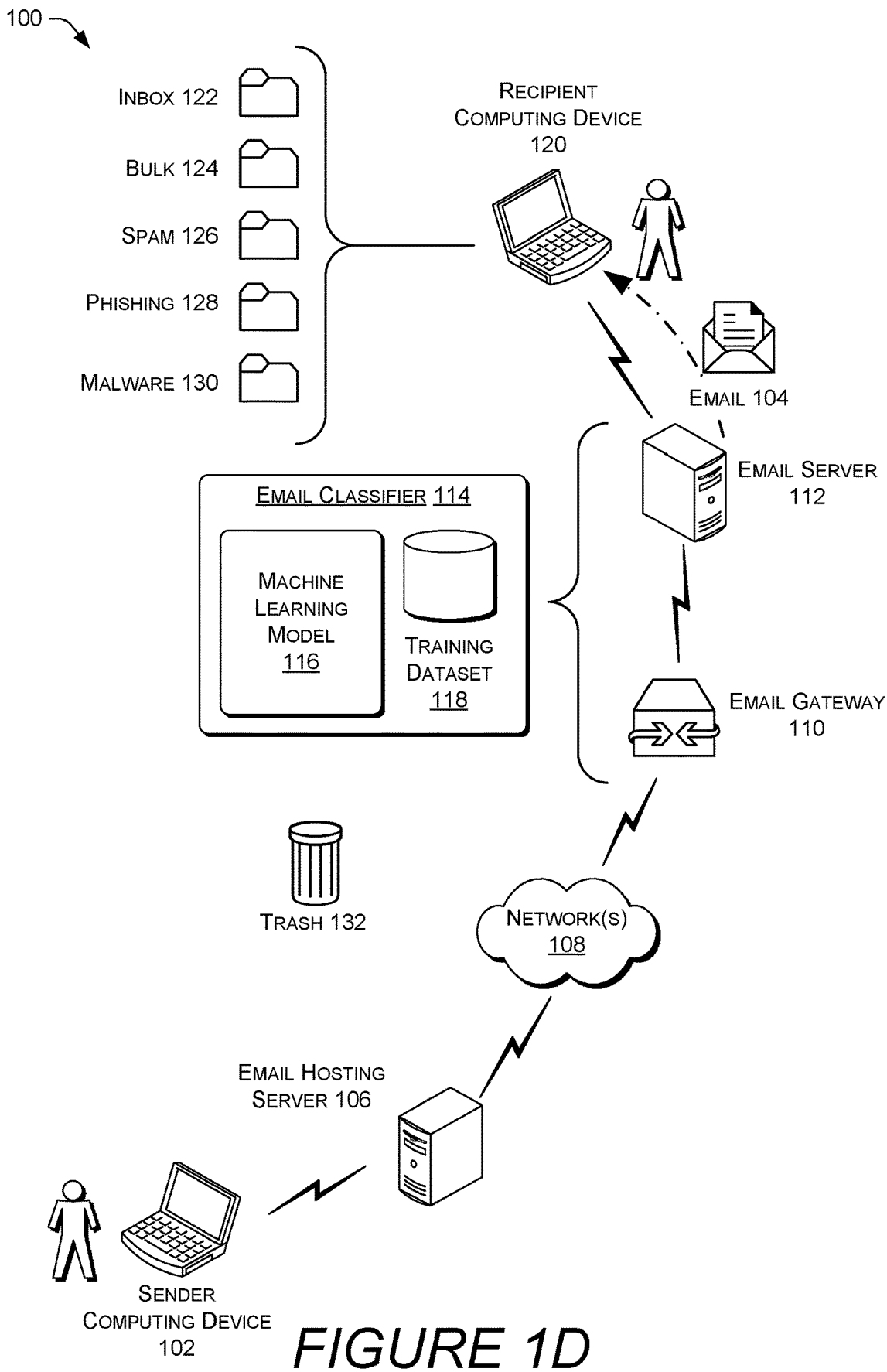

FIG. 1D shows the email 104 after it has moved through the email gateway 110 and the email server 112 to the recipient computing device 120. This is the processing typical for "good" emails. If the email 104 is a good email but incorrectly identified by the email classifier 114 as spam, a phishing email, etc. that is a false positive. It is likely that any classifier, especially if it evaluates a large number of emails, will generate some false positive results. Moving those emails to trash 132 without giving the recipient an opportunity to view the email causes the recipient to miss out on emails that he or she may like to receive. Thus, some or all of the emails classified by the email classifier 114 as spam, bulk, phishing, or malware may be passed on to the recipient computing device 120.

Figure 1E:
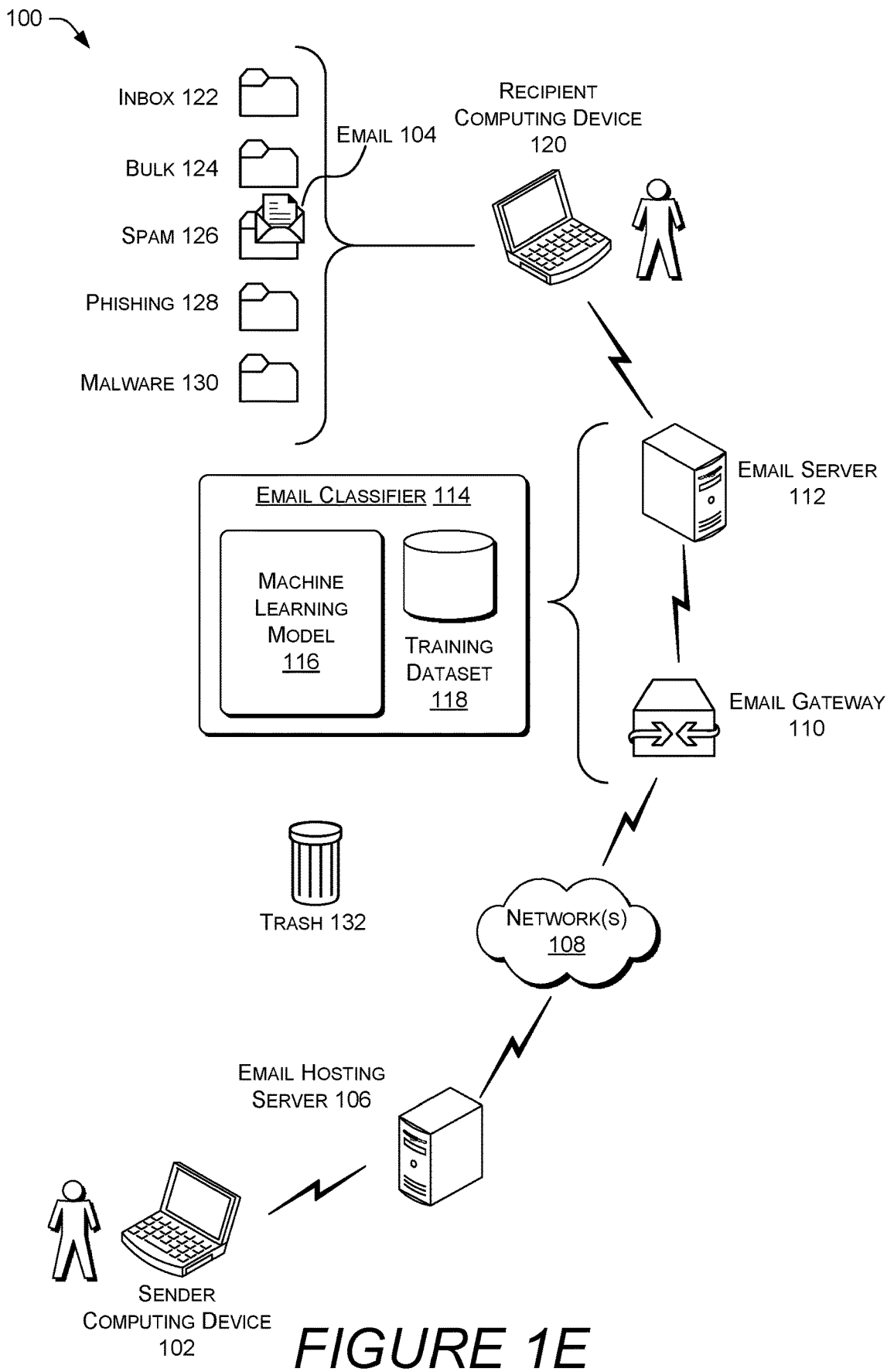

FIG. 1E shows the email 104 being placed in a spam folder 126 on the recipient computing device 120. The placement in a particular folder such as the spam folder 126 may be performed by an email client or other software on the recipient computing device 120 and/or the email server 112 without direct input from a user. The folder may be selected based on the classification provided to the email 104 by the email classifier 114. Bulk, spam, phishing, and malware emails may be placed in separate folders.

Alternatively, some or all of the bulk email folder 124, the spam folder 126, the phishing email folder 128, and the malware folder 130 may be combined. For example, all emails classified as spam, phishing, or bulk email may be placed in the same folder. Emails that are classified as good, or alternatively not classified as any of bulk, spam, phishing, or malware, may be placed in the inbox 122 for example. If an email can be classified as two or more different categories of email, then it may be placed in the folder that corresponds to the category with the highest confidence level.

Placing the email 104 in a folder on or accessible by the recipient computing device 120 provides the recipient an opportunity to review the email 104. This allows the recipient to catch false positive classifications by the email classifier 114. The recipient may also wish to view the email 104 even if it is classified correctly, for example, as a bulk email. The recipient may also manually label emails and by doing so can provide feedback and additional information for improving the training dataset 118.

Figure 2:
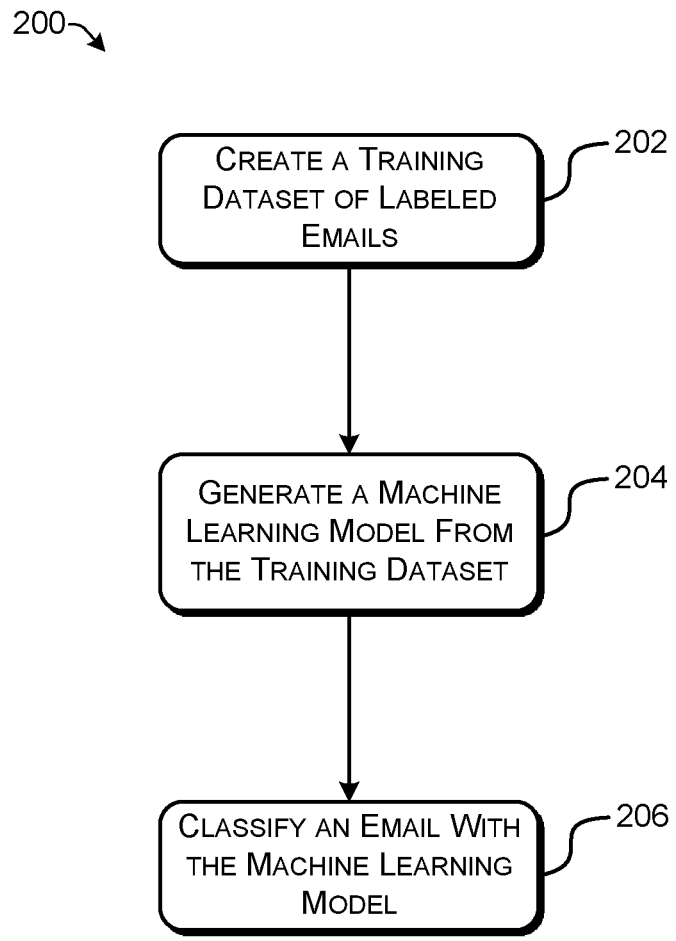
FIG. 2 is a flow diagram showing an illustrative process for classifying an email with a MLM.

FIG. 2 shows an illustrative process 200 for classifying email with a MLM. Process 200 may be performed by the email classifier 114 shown in FIG. 1.

At 202, a training dataset of labeled emails is created. Each example in the training dataset contains a target and one or more features. The target is the goal of the prediction which in this illustration is a label for an email such as good, spam, malware, etc. The features or attributes of the email such as sender email address, IP address, timestamp, the existence of previous communication between the sender and recipient, etc. The attributes are used to identify patterns which predict the target answer. In this disclosure, the features are selected to avoid using confidential information or PII.

At 204, a MLM is generated from the training dataset. The MLM may be the MLM 116 introduced in FIG. 1. Once the training dataset has been created, the MLM can be trained using supervised learning. Supervised learning is the machine learning task of learning a function that maps an input to an output based on example input-output pairs. It infers a function from labeled training data consisting of a set of training examples. In supervised learning, each example is a pair consisting of an input object (typically a vector) and a desired output value (also called the supervisory signal). A supervised learning algorithm analyzes the training data and produces an inferred function, which can be used for mapping new examples. An optimal scenario will allow for the algorithm to correctly determine the class labels for unseen instances. This requires the learning algorithm to generalize from the training data to unseen situations in a "reasonable" way. The MLM may be trained using any supervised learning algorithm.

At 206, an email is classified with the MLM. By training the MLM using the training dataset created at 202, the MLM can be configured to classify new emails according to the targets identified in the training dataset. For example, the email classified may be the email 104 shown in FIG. 1. Of course, the MLM may be used to classify more than a single email and may be applied to automatically and rapidly classify all or most of the emails received by an email system.

Figure 3:
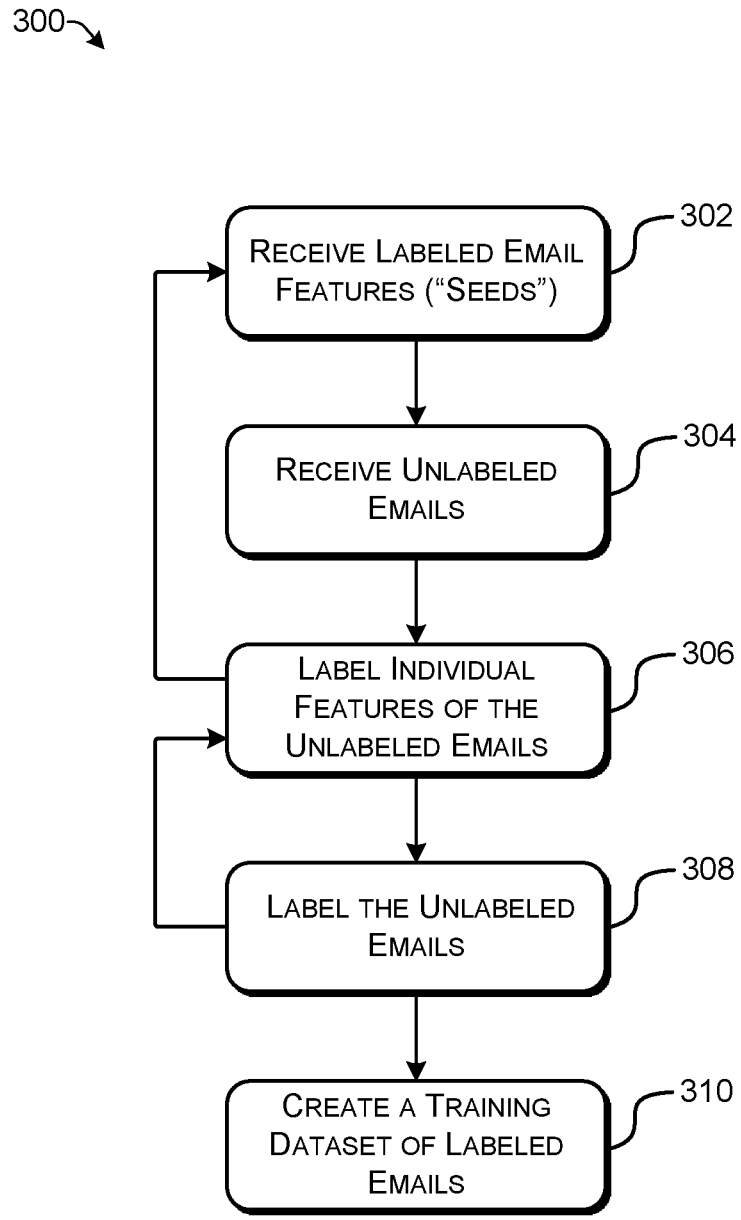
FIG. 3 is a flow diagram showing an illustrative process for creating a training dataset of labeled emails.

FIG. 3 shows an illustrative process 300 for creating a training dataset. Process 300 may represent subprocesses within step 202 of process 200.

At 302, labeled email features are received. The labeled email features may be such things as identifying a given email address as being associated with spam or a label that identifies a particular IP address as being associated with a computer that is known to send good email (e.g., the computer of a friend or another computer on the same local network). The labeled features may be received from many sources such as allowlists or denylists and may also be received from manual labeling of emails by users. For example, features from emails labeled as spam by users of an email system may be used to create a list of sender email addresses, IP addresses, host servers, and the like that are used to send spam. These labels may come from metadata or transmission data associated with emails and may be designed to avoid using confidential information or PII. Past user behavior as captured by a communication graph (i.e., a map of communications back and forth between multiple email accounts and history of the committee communication activity) may also be used to provide labels. Having a relationship in a communication graph with more than a threshold number of connections may be interpreted as indicating that emails from all parties in the relationship are good senders for each other. Search engine results and spam classification results by another system may also be used as sources of labels for email features.

These initial labels may be referred to as "seeds" because they provide a starting point for creating a cluster of emails or of email features that are similar, and thus, are believed to be associated with the same label (e.g., good, spam, bulk email, etc.). Each initial label or seed may be associated with a confidence level indicating how likely it is that the label is correct.

At 304, unlabeled emails are received. These unlabeled emails may be emails that already exist within an email system. The unlabeled emails may include but are not limited to newly received emails that have come into an email system from an external network.

At 306, individual features of the unlabeled emails are labeled. The individual features such as the sender email address may be labeled based on grouping with one of the labeled seed features. The grouping may be implemented as a form of clustering in which features that are similar are placed together in a same cluster. Each unlabeled email likely has multiple features which may be placed in respective clusters. Each cluster may inherit a label from the seeds that started the cluster. Thus, these labels may in turn be applied to the features of the unlabeled emails. These labels on the features may also be added to existing clusters as indicated by the path from 306 back to 302.

At 308, the unlabeled emails are labeled. Labeling the unlabeled emails is based on the labels of the individual features in those emails. For example, if all the features of an unlabeled email are features found in clusters labeled as being associated with malware, it is very likely that the unlabeled email itself is associated with malware and it may be labeled as a "malware" email. For some unlabeled emails, the features may indicate more than one label. One feature may indicate that it is a good email, while another indicates that it is spam, and a third suggests that it should be labeled as bulk email. In this instance, conflicts between multiple possible labels may need to be resolved. The conflicts can be resolved through a voting mechanism described below.

Labeling an email provides a label that may be attached to any or all of the features of that email. For example, if a given IP address was previously unknown and not labeled but is associated with an email that is spam, then the "spam" label may be applied to that IP address. This new label on an email feature may be provided to step 306 to increase the number of labeled features which in turn can provided more features for clusters at 302 to inform subsequent labeling. In an implementation, additional labeled features received from 308 may be added to clusters that are formed with the initial seed features. Thus, as process 300 iterates, the number of examples in each cluster may increase.

At 310, the labeled emails generated at 308 are used to create a training dataset. This training dataset includes a number of email messages with features (the features do not disclose confidential information or PII) and a label associated with the email. This provides labeled training data for use in supervised machine learning.

Figure 4:
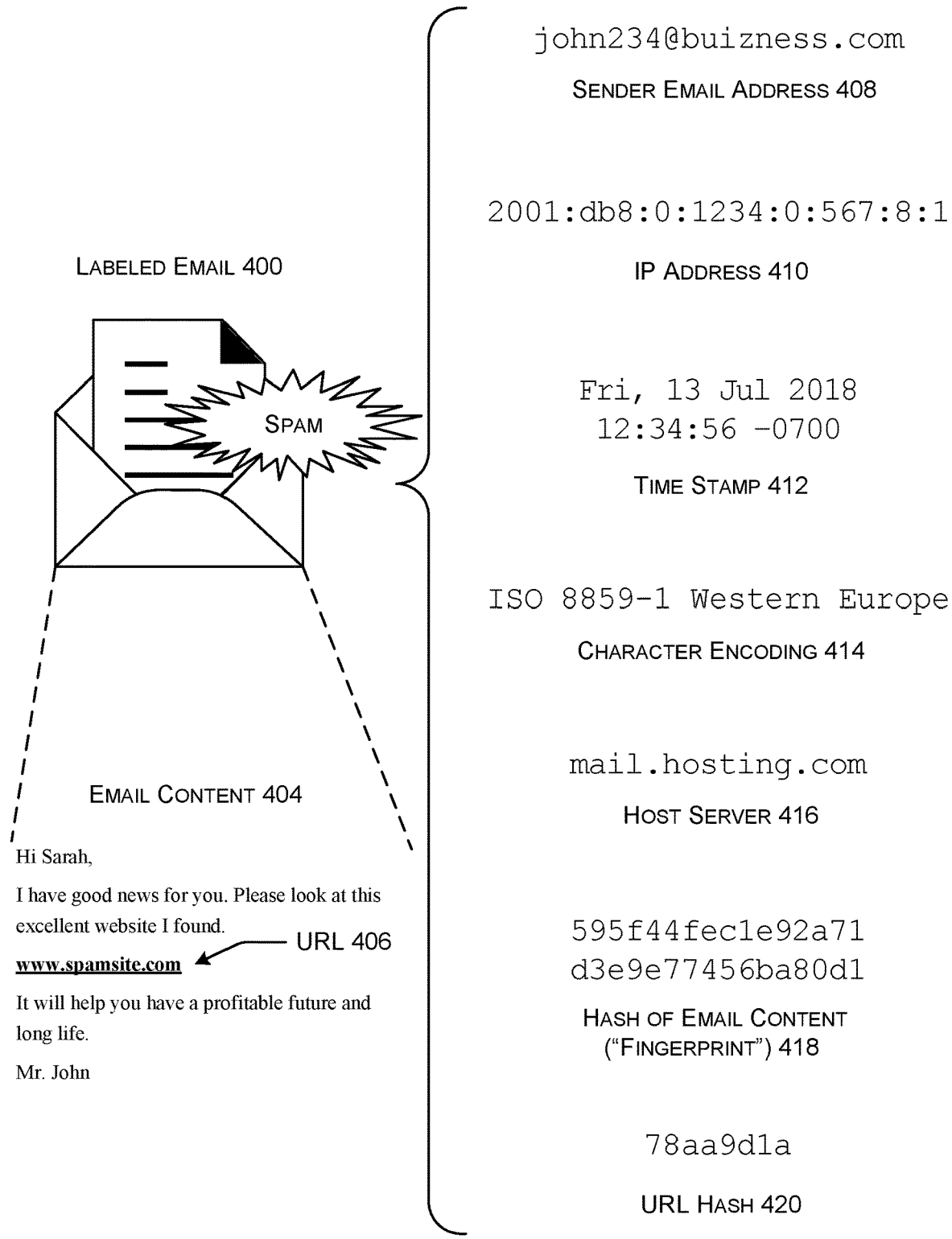
FIG. 4 shows features of an email message.

FIG. 4 shows an illustrative labeled email 400 and illustrative email features 402. The labeled email 400 includes email content 404 which may include a URL 406. In order to protect privacy and avoid accessing PII, the email content 404 is not used to label the labeled email 400. This presents a challenge because the portion of the labeled email 400 that may most clearly indicate if the email is a good email, spam, or another type of email is not available for analysis. However, the email features 402 which may include metadata and transmission data associated with the labeled email 400 may be analyzed without exposing confidential information or PII of the recipient.

Any number of email features 402 that do not expose PII may be used. The features discussed in FIG. 4 are merely illustrative and not limiting. The sender email address 408 is one feature that may be extracted from the labeled email 400. An IP address 410 of the computing device that sent the labeled email 400 is an additional feature. A timestamp 412 may be included with the labeled email 400 and may be indicative of the type of email (e.g., email sent during typical sleeping hours in the time zone of the recipient may be more likely to be spam or bulk email).

Character encoding 414 is another feature that may be used to analyze an email. Character encoding 414 may be suggestive of the language for the software installed on the sending computing device and/or of the location of the sending computing device. Machine learning may identify patterns based on character encoding for 414. The host server 416 responsible for sending out the labeled email 400 is also a potentially useful feature.

If the email recipient or party responsible for managing the email systems of the recipient affirmatively opts in, the email content 404 including any URLs 406 within the email may be used in a way that does not disclose confidential information or PII. For example, a hash of the email content 418 (also called a "fingerprint") may be used to represent email content 404 and identify if the same or similar email content 404 appears in other emails by comparing the hash values. Similarly, a URL hash 420 included in the label email may be generated and used to see if the same URLs appear in other emails.

The hash of email content 418 and the URL hash 420 may be generated by applying a hashing algorithm to the email content 404 or the URL 406 respectively. A hash value (or simply hash) is a value generated from a string of text. The hash is substantially smaller than the text itself and is generated by a formula in such a way that it is extremely unlikely that some other text will produce the same hash value. One hashing function that may be used is the MD5 algorithm. Additionally, distance-sensitive hashing (DSH) may be used to generate the hash of email content 418 or the URL hash 420. DSH is a generalization of locality-sensitive hashing (LSH) that seeks a family of hash functions such that the probability of two points having the same hash value is a given function of the distance between them.

Figure 5:
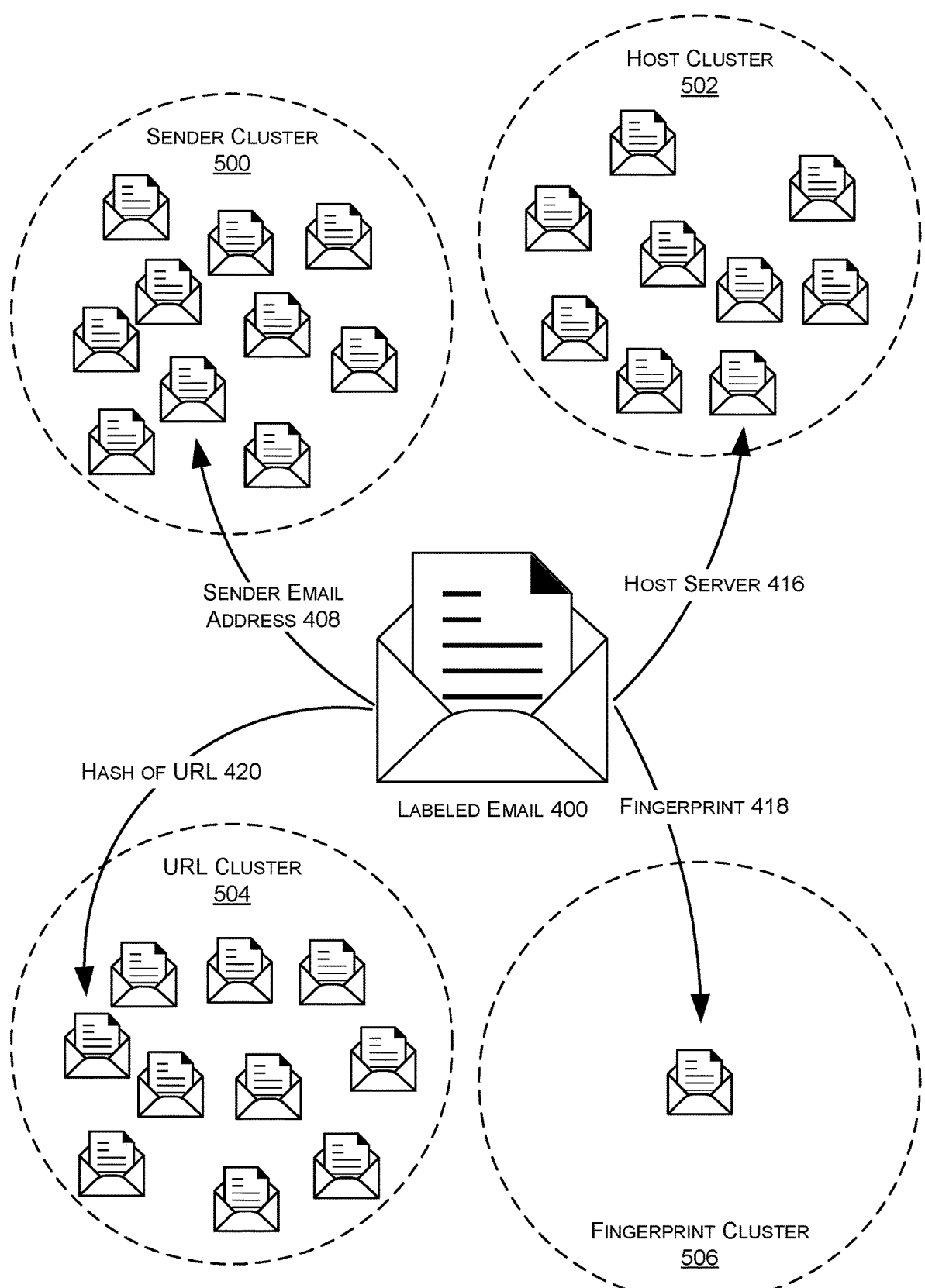
FIG. 5 shows illustrative clusters of features from email messages.

FIG. 5 shows how features from the labeled email 400 may contribute to cluster formation. In this example, the illustrative clusters are a sender cluster 500, a host cluster 502, a URL cluster 504, and a fingerprint cluster 506. A greater or lesser number of clusters may be used. Each cluster contains instances of features from emails that cluster together. Any suitable clustering technology may be used to form the clusters discussed throughout this disclosure. Clustering (which might also be referred to as "grouping" or "categorization") refers to a process of grouping together similar items and separating dissimilar items based upon attributes of the items. According to an implementation disclosed herein, various types of algorithms might be utilized to cluster the emails or features of emails. For example, in different implementations, a k-Means algorithm, a k-nearest neighbor ("KNN") algorithm, or a MinHash algorithm might be utilized to form clusters. In other implementations, a latent factor clustering algorithm, such as latent semantic indexing ("LSI"), latent Dirichlet allocation ("LDA"), or probabilistic LSI ("PLSI"), might be utilized to cluster the emails and email features.

Each cluster contains other emails that have the same feature as the labeled email 400 or at least a feature similar enough that it clusters together. For example, the sender cluster 500 may include emails that are sent from the same sender email address 408 of the labeled email 400. The host cluster 502 may include emails that are sent through the same host server 416 as the labeled email 400. In this example, the fingerprint cluster 506 only includes this labeled email 400 because there are no other emails with the same "fingerprint" or hash of email content 418. In an implementation, fingerprint cluster 506 may not be formed because there may be a minimum number of emails required to form a cluster and a single email may be less than the minimum number.

Figure 6:
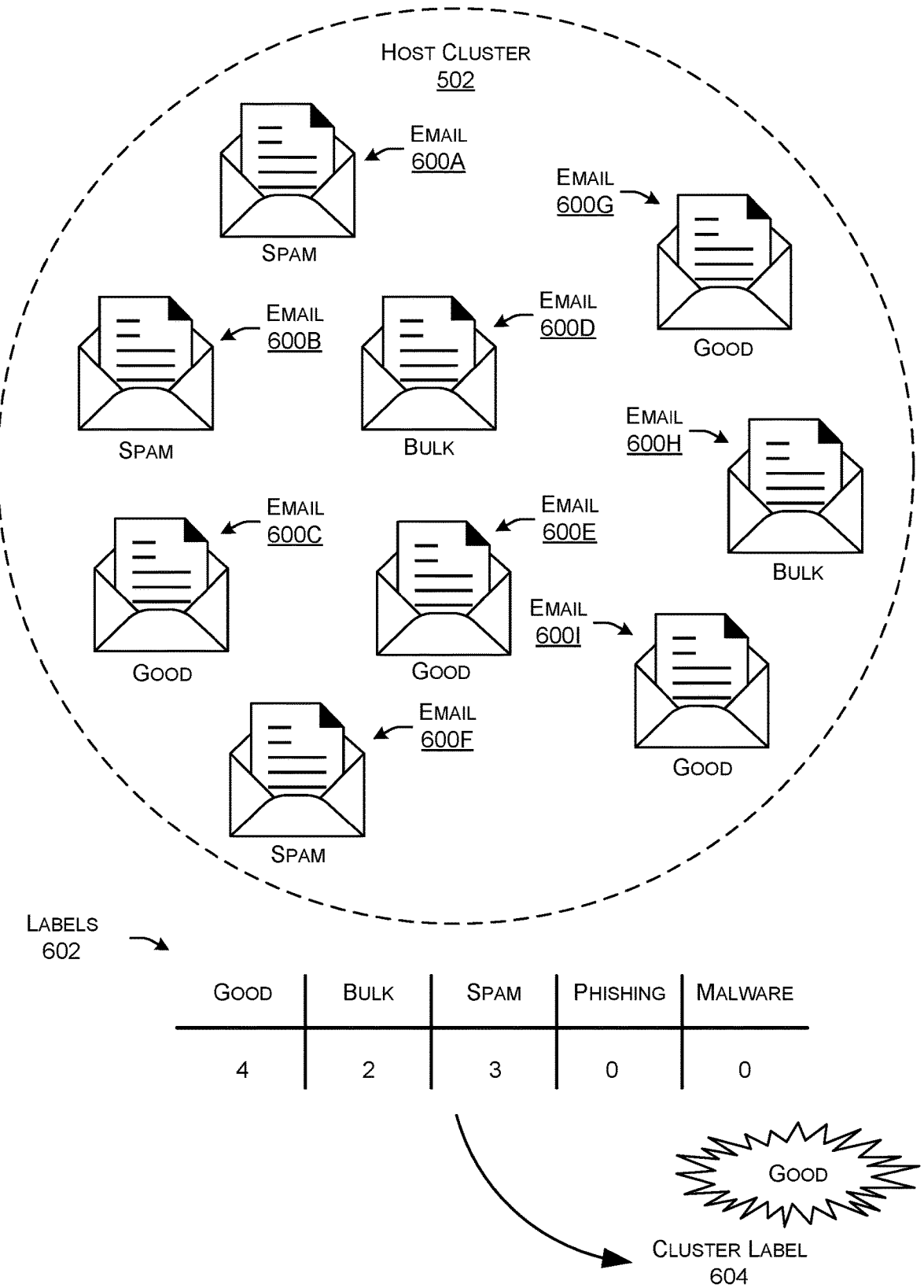
FIG. 6 shows one illustrative cluster of an email feature.

FIG. 6 shows applying a label to an illustrative cluster, here the host cluster 502 introduced in FIG. 5. The host cluster 502 includes multiple emails 600A-600I sent from the same host server 416 or host servers that are similar enough they cluster together. Email 600F represents the labeled email 400. Each of the emails 600A-600I may be associated with a label 602 such as spam, good, or bulk. These label for the host cluster 502 as a whole may be derived from the labels 602 of the emails 600 within the cluster.

Any of a number of various voting techniques may be used to choose a single label for the cluster from the labels 602 of the included emails 600. For example, the most common one of the labels 602 may be applied as the cluster labels 604. Alternatively, confidence levels for each of the labels of emails 600 may be used to weigh the voting and identify which of labels 602 is used for the cluster. In this example, because more of the emails 600 in the host cluster 502 are labeled "good" than any other label, majority voting results in the cluster label 604 being "good."

Figure 7:
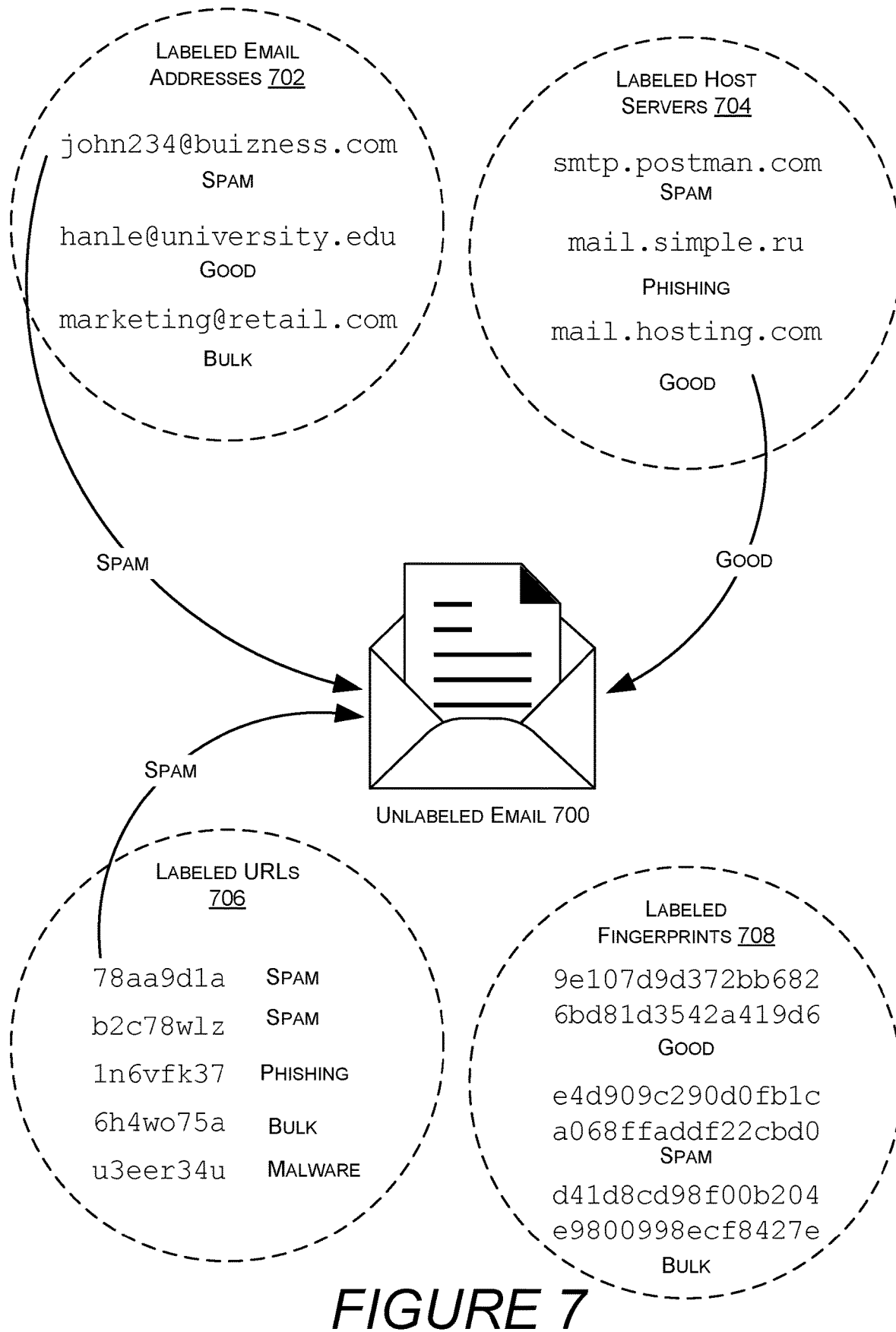
FIG. 7 shows labels for an unlabeled email derived from multiple clusters of email features.

FIG. 7 shows a different use of clustering in which various features of an unlabeled email 700 are used to provide potential labels for the unlabeled email 700. Labels may be associated with the unlabeled email 700 based on clusters to which features of the unlabeled email 700 belong. In this example, the clusters are labeled email addresses 702, labeled host servers 704, labeled URLs 706, and labeled fingerprints 708.

If the email address of the sender of the unlabeled email 700 is found in a cluster of labeled email addresses 702, the label for the sender email address which in this case is "spam" may be applied to the unlabeled email 700. Similarly, if a label for the email host server that sent the unlabeled email 700 and a label for a hash of a URL included in the unlabeled email 700 may also be compared to clusters to identify labels for those features of the unlabeled email 700.

If features of the unlabeled email 700 are not found in any existing cluster, then that feature may not be a source of a potential label for the unlabeled email 700. In this example, a hash of the contents of the unlabeled email 700 does not match any of the hashes in the labeled fingerprint 708 cluster. Thus, the fingerprint of the unlabeled email 700 does not provide a potential label.

Figure 8:
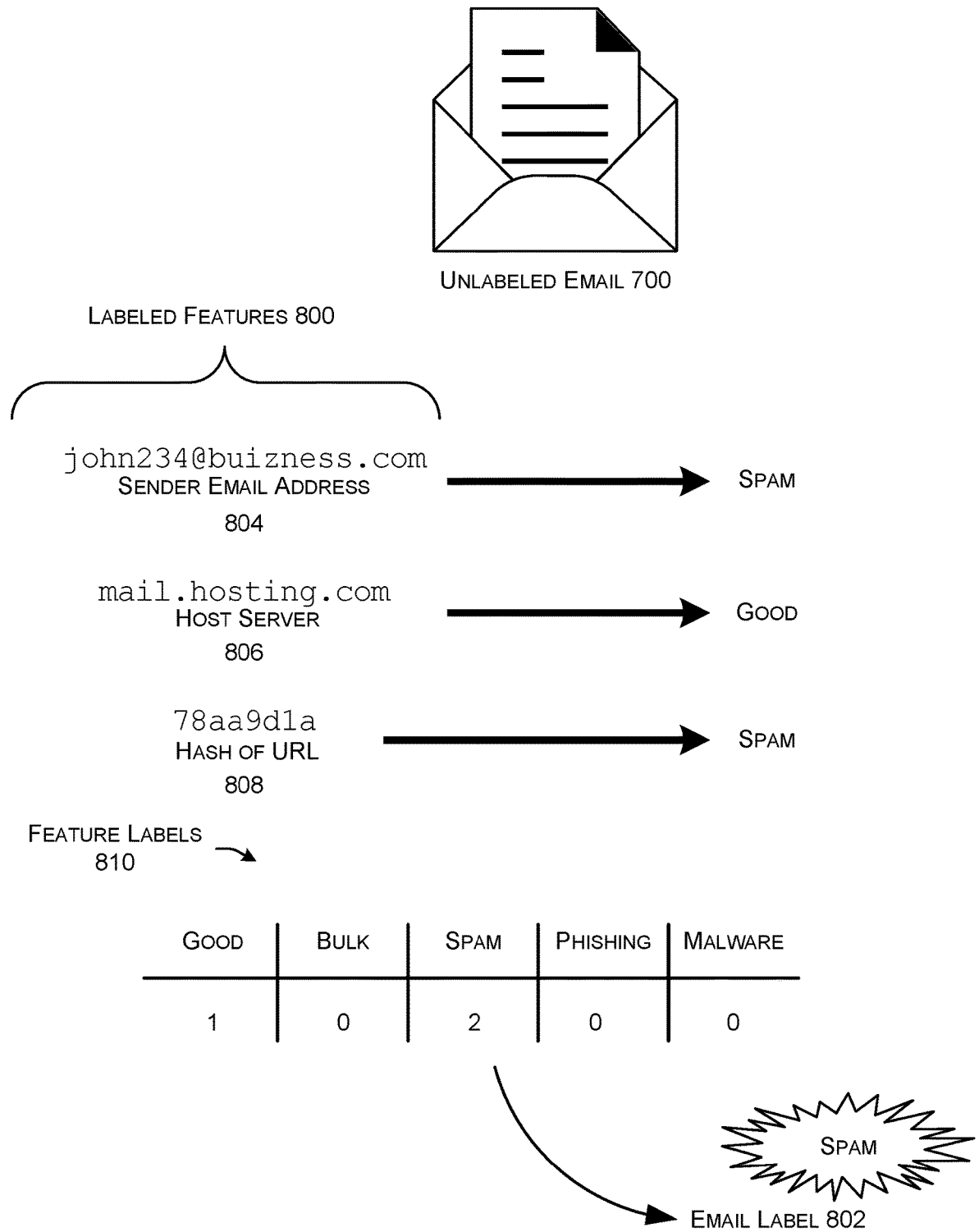
FIG. 8 shows an example of voting on a label to apply to an email message.

FIG. 8 shows use of the labeled features 800 of the unlabeled email 700 to identify an email label 802 for the unlabeled email 700. Labeled email features 800 from FIG. 7 may include the sender email address 804, the host server 806, and the hash of the URL 808. In this example, clustering of the sender email address 804 associates that address with the category "spam." Clustering of the host server 806 associated that server identity with the category "good." The hash of the URL 808 is associated with the category "spam" based on its clustering. Thus, the feature labels 810 indicate that one feature of the unlabeled email 700 suggests a "good" label and two features suggest a "spam" label. A voting technique may be used to determine which of the conflicting labels is applied to the unlabeled email 700. Some voting techniques allow for multiple labels to be applied to an email. However, good and spam are conflicting categories that cannot both be applied to the same email. One voting technique that may be used is removal of the minority voting category. In this example, the category "good" receives the fewest votes and it is the minority category. Removal of that category leaves only votes for the spam category, and thus, the email label 802 applied to the unlabeled email 700 may be spam.

Figure 9:
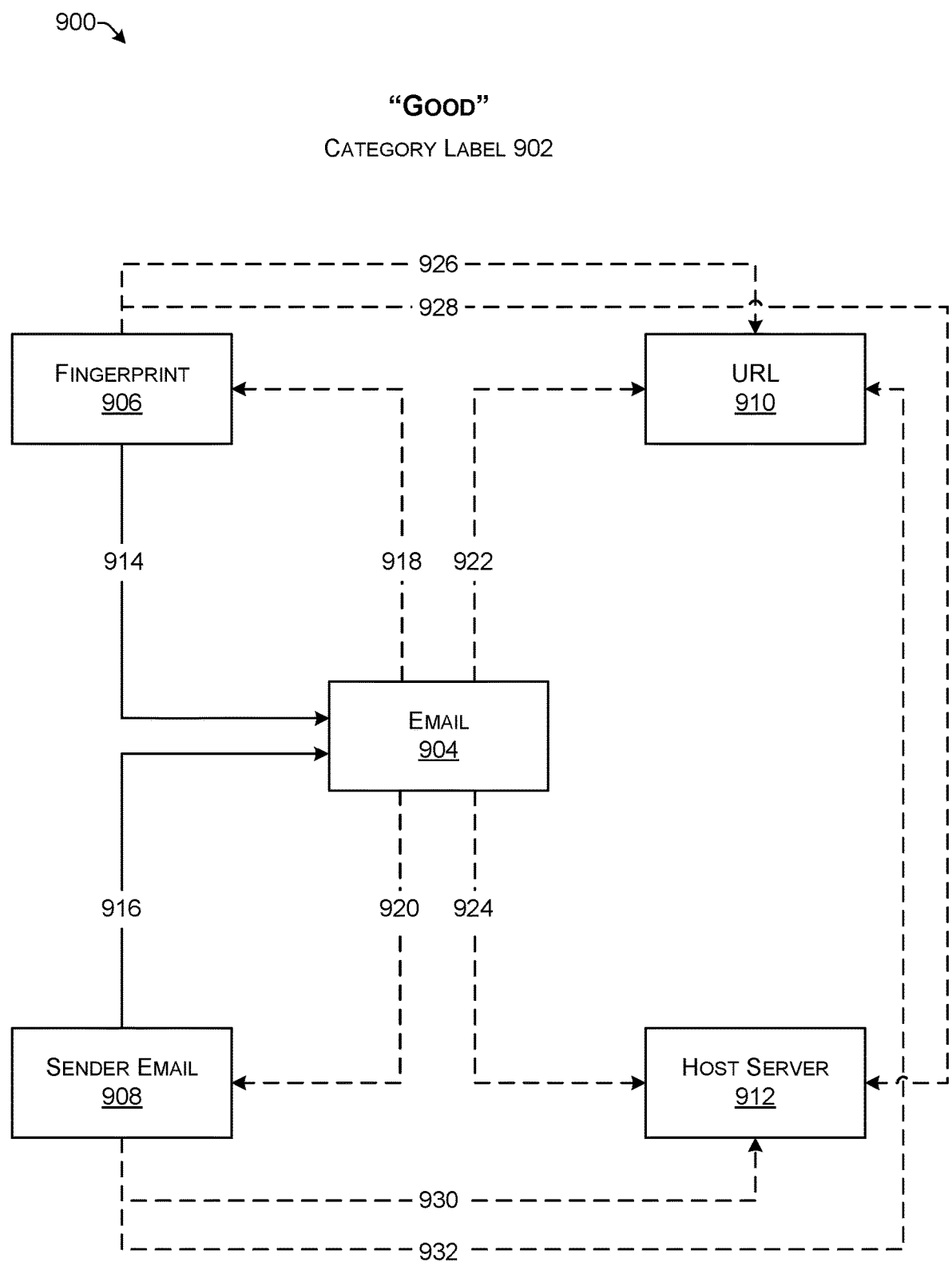
FIG. 9 is an illustrative expansion graph for the "good" category label.

FIG. 9 shows an illustrative expansion graph 900 for the "good" category label 902. This expansion graph 900, and other expansion graphs, are representations of inference logic for different entities in the system. Entities include principal type entities which are the email 904 and clustering type entities that are email features such as fingerprint 906, sender email address 908, URL 910, and host server 912. Clustering type entities may include, but are not limited to, any of the email features 402 introduced in FIG. 4. The clustering type entities are selected to avoid including confidential information or PII. The expansion graph 900 includes two types of expansion edges: "derivative edges" 914, 916 indicated by solid lines and "clustering edges" 918-932 indicated by dotted lines. The edges are directional and derivative edges indicate that the label for a principal entity may be derived from labels of clustering type entities. One example of this is shown in FIGS. 7 and 8 in which the unlabeled email receives labels from labels applied to its features. Conversely, clustering edges indicate relationships in which a clustering entity may receive a label from the principal entity. This is illustrated in FIGS. 5 and 6 in which the labeled email 400 provides its label to multiple clusters of email features.

The edges represent inference logic that is specific to the category label 902 ("good") of the expansion graph 900. Thus, for the label "good" if the fingerprint 906 of the email 904 is known to be good then the email itself may be inferred to be a good email based on the edge 914. Similarly, if the sender email address 908 is known to be good then the email 904 may also be labeled good because edge 916 connects these two nodes in the graph. However, just because an email includes a good URL 910 that does not necessarily indicate that the email itself is good. For example, spam and bulk email may include URLs that are identified as good. Accordingly, there is no derivative edge connecting the URL 910 to the email 904.

Regarding the email 904 that has a category label 902 "good," there are multiple clustering edges 918-924 going from the email 904 to the fingerprint 906, the sender email address 908, the URL 910, and the host server 912. These clustering edges 918-924 indicate that if the email 904 is known to be good it may be inferred that the fingerprint 906 of the email, the sender email address 908, any URLs 910 included in the email, and the host server 912 that sent the email 904 are also good.

Clustering edges may also be present between clustering type entities. In this expansion graph 900, there is a clustering edge 926 from fingerprint 906 to URL 910, a clustering edge 928 from fingerprint 906 to host server 912, a clustering edge 930 from sender email address 908 to host server 912, and a clustering edge 932 from sender email address 908 to URL 910. These clustering edges indicate inferred relationships that if one of these features of the email is "good" then the other feature is also likely to be "good." For example, email sent from a sender email address 908 that is known to be good such as the email address of a friend or coworker indicate that the host server 912 sending that email as well as any URLs 910 included in the email are also good.

In an implementation, any or all of the edges in this expansion graph 900 or any other expansion graph may be associated with a confidence degrading ratio. The confidence degrading ratio indicates the degree of loss of confidence when a label is expanded along one of the edges of the expansion graph 900. For ease of discussion and not limitation, the confidence degrading ratio may be represented as a value between 0 and 1 with 0 indicating no confidence and 1 indicating maintaining the original confidence level without degrading. Practically, a confidence level of 0 would be represented by the lack of an edge. In one implementation, the confidence degrading ratio of derivative edges (solid lines) may be 1 indicating no degradation. Thus, if there is a 0.9 or 90% confidence that the fingerprint 906 is labeled good then the derivative edge 914 does not change the confidence level and applies a 0.9 confidence level that the email 904 is also good. In an implementation, the confidence degrading ratio of clustering edges (dotted lines) may decrease confidence by half by applying a confidence degrading ratio of 0.5. Thus, if the email 904 is labeled with 100% confidence that it is a "good" email, then the clustering edge 924 reduces that confidence level by half and applies a confidence level of 50% to the label of "good" on the host server 912. Other confidence degrading ratios may be applied to the edges besides those described above and each edge within a expansion graph may have a different confidence degrading ratio.

Thus, expansion graphs such as expansion graph 900 for the category label 902 of "good" allow labels to be expanded from emails to the features of emails and from features to emails as well as other features. The relationships that may be inferred are represented by the edges and the confidence in that inference is represented by a confidence degrading ratio applied to the edge.

Figure 10:
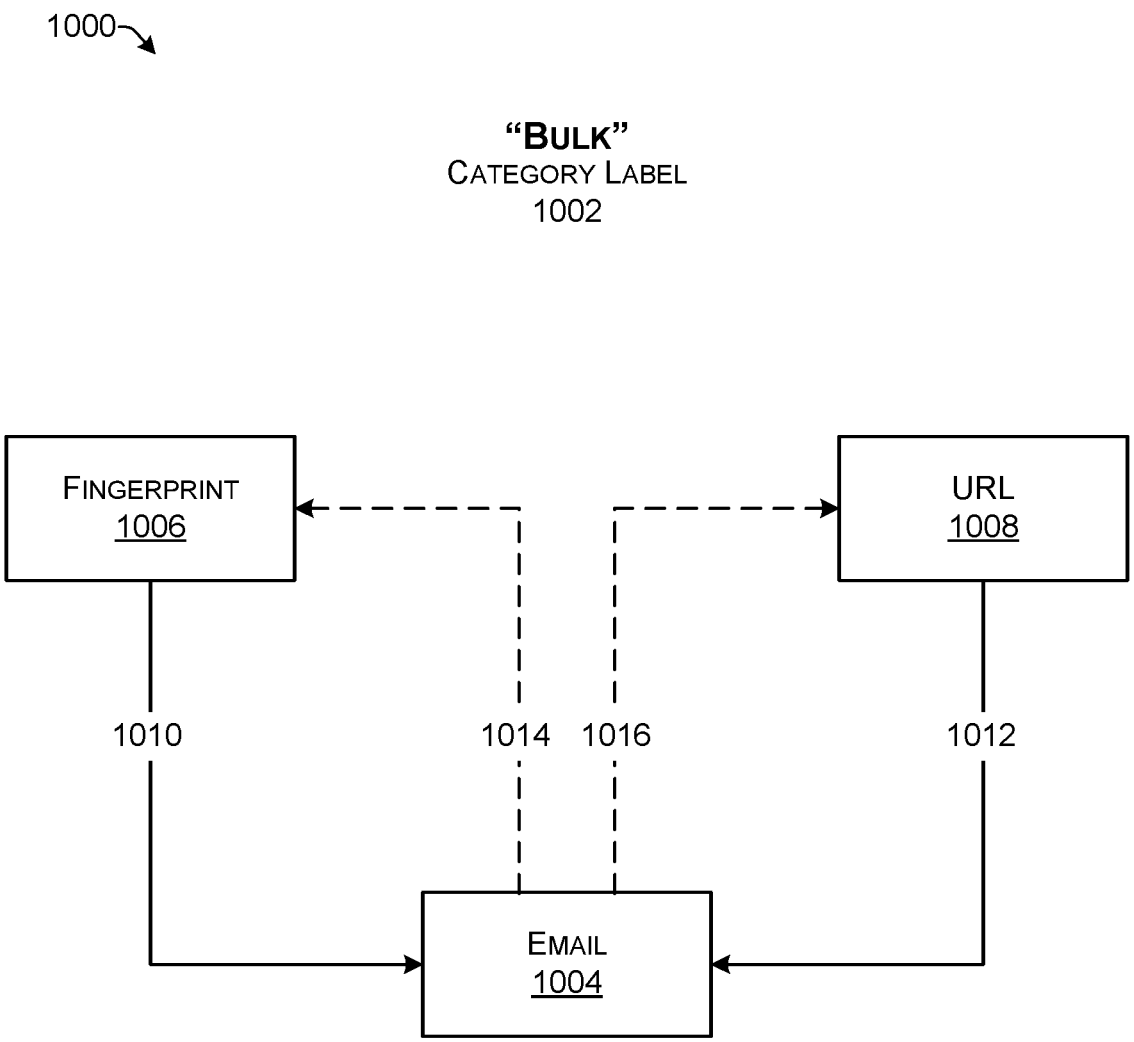
FIG. 10 is an illustrative expansion graph for the "bulk" category label.

FIG. 10 shows an illustrative expansion graph 1000 for the "bulk" category label 1002. For bulk email, the email 1004, the expansion graph 1000 includes edges between the fingerprint 1006 node and the URL 1008 node. Thus, other clustering type entities do not influence application of the "bulk" category label 1002 to an email. The derivative edges 1010 and 1012 allow the email 1004 to receive a label from the fingerprint 1006 or the URL 1008. This indicates that if the hash of an email content is the same as the hash of other emails which are labeled as bulk email, then the unlabeled email is likely bulk email. Similarly, if inclusion of a URL in an email suggests that the email is bulk email, then presence of that URL in an unlabeled email is indicative that the unlabeled email is bulk email. The clustering edges 1014 and 1016 represent the reverse relationships. If the email 1004 is identified as a bulk email, that it is likely that other emails having the same fingerprint 1006 or including the same URL 1008 are also bulk emails.

Figure 11:
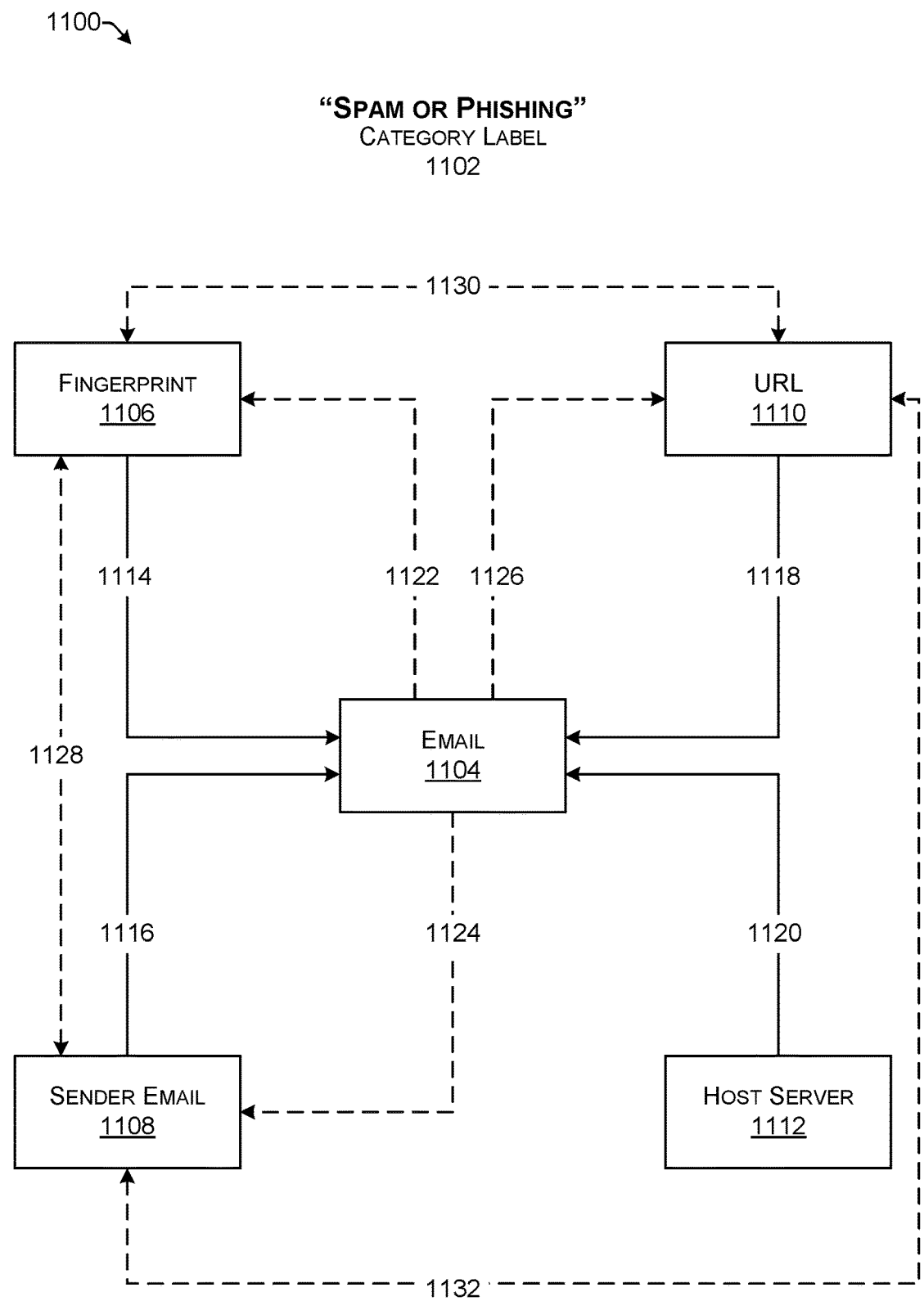
FIG. 11 is an illustrative expansion graph for the "spam or phishing" category label.

FIG. 11 shows an expansion graph 1100 that applies to both the spam and phishing category labels 1002. Although spam and phishing are different types of unwanted email, the same inferred relationships between the principal entity type and the clustering entity types apply to both. The expansion graph 1100 shows the relationships between the principal entity type of email 1104 and the clustering entity types of fingerprint 1106, sender email address 1108, URL 1110, and host server 1112. Each of the fingerprint 1106, sender email address 1108, URL 1110, and host server 1112 can be a source of the "spam" or "phishing" category label 1102 for the email 1104 as shown by the derivative edges 1114-1120. For example, if a URL 1110 is known to be a phishing URL, then emails containing that URL may be labeled as phishing emails. This expansion logic is represented as the derivative edge 1118 from URL 1110 to email 1104.

There are also multiple clustering edges 1122-1132 in the expansion graph 1100 indicating how the spam or phishing category label 1102 applied to the email 1104 may influence the label of email features and how some of the labels of the email features influence other email features. There is no clustering edge to the host server 1112 clustering entity because a spam or phishing email coming from a particular email host server does not necessarily indicate that the host server 1112 sends only spam and/or phishing emails. There are multiple bidirectional clustering edges 1128-1132 indicating that if either of a pair of email features is identified as being associated with spam or phishing, then the other feature may share the same label. For example, if a URL 1110 is identified as being found in spam emails, then sender email addresses 1108 which send that URL 1110 may have the "spam" label expanded to them along edge 1132.

Figure 12:
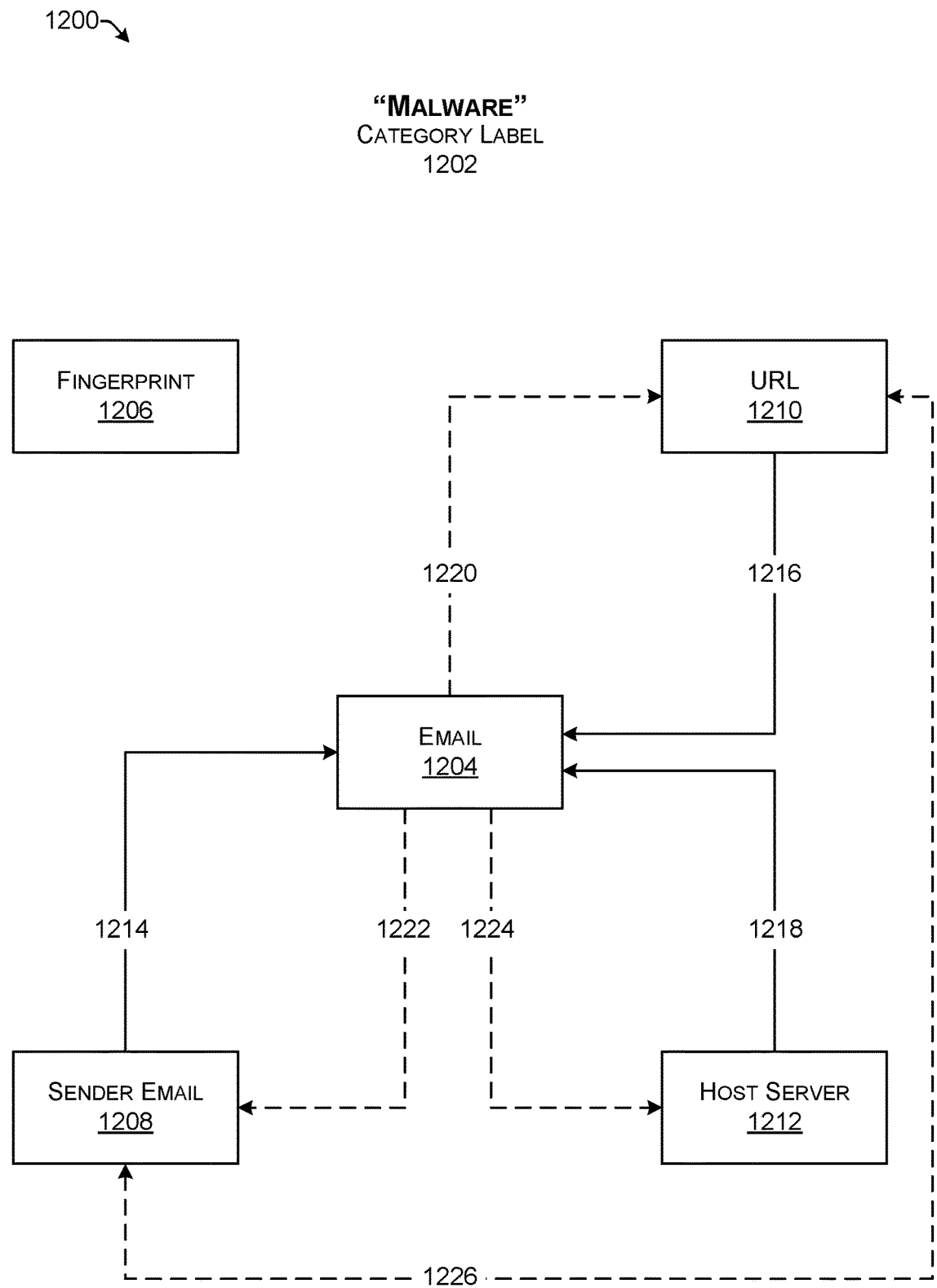
FIG. 12 is an illustrative expansion graph for the "malware" category label.

FIG. 12 shows an expansion graph 1200 for the "malware" category label 1202. This expansion graph 1200 includes the email 1204 principal entity and the clustering type entities of fingerprint 1206, sender email address 1208, URL 1210, and host server 1212 as in FIGS. 9 and 11. However, the relationships indicated by the edges are different. For one, the fingerprint 1206 clustering entity is not connected by an edge to any of the other entities. This indicates that the hash of email content does not suggest one way or the other that the email contains malware. However, if either of the sender email address 1208, URL 1210, or host server 1212 are labeled as malware then the derivative edges 1214-1218 carry the malware label to the email 1204. Reciprocal relationships between the email 1204 and these three clustering type entities also exist as shown by the clustering edges 1220-1224. The bidirectional clustering edge 1226 between the category of sender email address 1208 and URL 1210 indicates that if a either of a sender's email address or URL included in an email are labeled as malware, then the other will likely receive that label as well. Of course for these and all other relationships indicated by edges in the expansion graph 1200, as well as other expansion graphs discussed herein, the confidence level in the applied label may be modified based on the original confidence level for a cluster and the confidence degrading ratio of any edges traversed in order to expand the label to a new entity.

Figure 13:
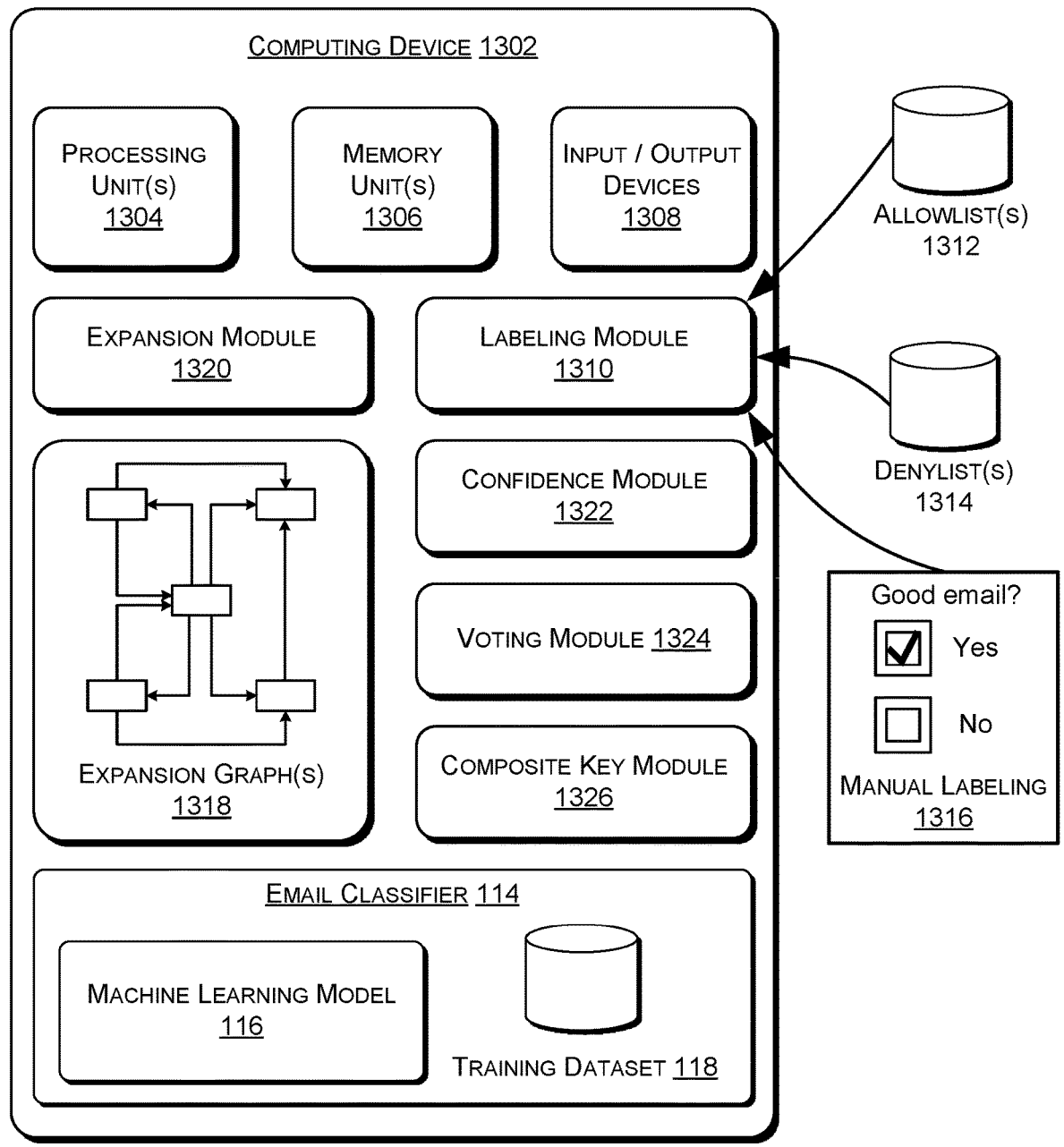
FIG. 13 is a computer architecture of an illustrative computing device capable of labeling emails to create a training dataset.

FIG. 13 shows a computer architecture 1300 of an illustrative computing device 1302. The computing device 1302 may represent one or more physical or logical computing devices located in a single location or distributed across multiple physical locations. For example, computing device 1302 may represent the email server 112 and/or the email gateway 110 shown in FIGS. 1A-1E. However, some or all of the components of the computing device 1302 may be located on a separate device such as a personal computer, desktop computer, notebook computer, or the like. The computer architecture 1300 is capable of implementing any of the technologies or methods discussed in this disclosure.

The computing device 1302 includes one or more processing unit(s) 1304, one or more memory unit(s) 1306, and input/output devices 1308. Although no connections are shown between the individual components illustrated in FIG. 13, the components can be connected electrically in order to interact and carry out device functions. In some configurations, the components are arranged so as to communicate via one or more buses which can include one or more of a system bus, a data bus, an address bus, a PCI bus, a mini-PCI bus, and any variety of local, peripheral, and/or independent buses.

The processing unit(s) 1304 can represent, for example, a central processing unit (CPU)-type processing unit, a graphical processing unit (GPU)-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASIC s), Application-Specific Standard Products (ASSPs), System-on-a-Chip Systems (SOCs), Complex Programmable Logic Devices (CPLDs), etc.

The memory unit(s) 1306 may include internal storage, removable storage, local storage, and/or remote storage to provide storage of computer-readable instructions, data structures, program modules, and other data. The memory unit(s) 1306 may be implemented as computer-readable media. Computer-readable media include at least two types of media: computer-readable storage media and communications media. Computer-readable storage media include volatile and non-volatile, removable and non-removable media implemented in any method or technology for storage of information such as computer-readable instructions, data structures, program modules, or other data. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communications media may embody computer-readable instructions, data structures, program modules, or other data in a modulated data signal, such as a carrier wave, or other transmission mechanism. As defined herein, computer-readable storage media and communications media are mutually exclusive. For purposes of the claims, the phrase "computer-readable storage media," and variations thereof, does not include waves or signals per se.

Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

In an implementation, memory unit(s) 1306 can include one or more data stores. In some examples, a data store includes data storage such as a database, data warehouse, or other type of structured or unstructured data storage. In some examples, a data store includes a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example.

The input/output devices 1308 may include devices such as a keyboard, a pointing device, a touchscreen, a microphone, a camera, a display, a speaker, a printer, and the like as well as one or more interface components such as a data I/O interface component ("data I/O").

The computing device 1302 includes multiple modules that may be implemented as instructions stored in the memory unit(s) 1306 for execution by processing unit(s) 1304 and/or implemented, in whole or in part, by one or more hardware logic components or firmware. The number of illustrated modules is just an example, and the number can be higher or lower in any particular implementation. That is, functionality described herein in association with the illustrated modules can be performed by a fewer number of modules or a larger number of modules on one device or spread across multiple devices.

A labeling module 1310 assigns a communications-category label to an unlabeled entity such as a principal entity which may be an email or clustering entity which may be an email feature. The communications-category label may be one of good, spam, phishing, bulk, malware, or another label. External sources of information such as one or more allowlist(s) 1312, one or more denylist(s) 1314, and manual labeling 1316 may be used by the labeling module 1310 to label an unlabeled entity. These sources of information provide "seed" labels that are used to form clusters which in turn are leveraged to assign communications-category labels to previously unlabeled entities. Allowlist(s) 1312 may include lists of email features that are known or believed to be associated with good emails. For example, allowlist(s) 1312 may include a list of email addresses or IP addresses that are considered to be spam free. Allowlists may be created by users as lists of senders they wish to receive email from such as through affirmative opt-in. In an implementation, inclusion of an email feature on an allowlist overrides any denylists or other filters and allows emails from senders on the allowlist(s) 1312 to be delivered to an email inbox instead of being blocked or placed in a spam folder. For example, email addresses of other users in the same company as the recipient may be included in an allowlist(s) 1312.

The denylist(s) 1314 include lists of email features that are known or believed to be associated with unwanted communications such as spam or phishing communications. Domain Name System (DNS)-based Denylists, or DNSBLs, are one type of denylist 1314 that can be used for heuristic filtering and blocking. A third-party website may publish lists (typically of IP addresses) via the DNS, in such a way that email servers can easily be set to reject email from those sources. There are multiple DNSBLs, each of which reflects different policies: some list sites known to emit spam, others list open mail relays or proxies, and others list ISPs known to support spam.

Manual labeling 1316 may be provided by the recipient of an email. Receiving a manual label from the recipient maintains privacy and confidentiality of the email contents because only the recipient himself or herself evaluates the email. Information obtained from manual labeling 1316 may be less detailed than the classification scheme implemented by the labeling module 1310. For example, the manual labeling 1316 may simply indicate whether a given email is a good email or not. If it is indicated as a good email, then that may be interpreted as a strong indication that the email is not spam or another type of unwanted communication. If the email is labeled as not being a good email then that may be used together with other information to identify that one or more features of the email is associated with a specific type of unwanted communication such as spam, bulk email, phishing, or malware.

The labeling module 1310 may also use one or more expansion graph(s) 1318 to assign the communications-category label to an unlabeled communication based on features of the unlabeled communication. The expansion graph(s) 1318 may be one or more of the expansion graphs shown in FIGS. 9-12. Each expansion graph is associated with a communications-category label and contains a number of entities connection by directional edges to each other. The entities may include a principal entity such as an email or other message and one or more clustering type entities such as email address of the sender, IP address of the email host server, a timestamp, etc. The feature entities in the expansion graph(s) 1318 may be selected so that they do not include PII.

The labeling module 1310 may use information about one of the feature entities provided from one or more allowlist(s) 1312, one or more of the denylist(s) 1314, manual labeling 1316, or another source and relationships represented by the expansion graph(s) 1318 to assign the communications-category label to the unlabeled communication.

Expansion module 1320 may function to "expand" a communications-category label to a second feature of the unlabeled communication based on the expansion graph(s) 1318. Recall that both the communication itself, such as an email, may have a category label and individual features of the communication such as hash of the email content or the identity of an embedded URL may also have a category label. These category labels are not necessarily the same. However, if the labeling module 1310 has applied a communications-category label to a communication, then in some implementations the expansion module 1320 may apply that same communications-category label to other features of the communication as indicated by the directional edges and nodes in the expansion graph(s) 1318.

A confidence module 1322 assigns a probability to the communications-category label based on the expansion graph(s) 1318. As discussed above, one or more of the edges in the expansion graph(s) 1318 may be associated with a confidence degrading ratio. Thus, the confidence in the initial source for the communications-category label and the confidence degrading ratios for any edges of the expansion graph(s) 1318 traversed to assign the confidence-category label to the second feature may be used to identify a probability that the communications-category label assigned to the feature of the unlabeled communication is correct. Different sources of labels may have different starting confidence levels. For example, the confidence level of a label derived from manual labeling 1316 may be given a high confidence level of, for example, 0.9. However, a label derived from a single denylist 1314 may be given a lower confidence level such as 0.4. Thus, a combination of the initial confidence levels for the source of the label and the confidence degrading ratios of the edges of the expansion graph(s) 1318 traversed to apply that label to a second, different feature of the communication may be considered by the confidence module 1322.

A voting module 1324 may be used to apply a set of voting rules to resolve conflicts between multiple communications-category labels that could potentially be assigned to the unlabeled communication. Different sources of information may provide different communications-category labels that could be applied to a communication such as an email. Ultimately, it may be desirable to identify a single communications-category label such as spam, malware, or good to apply to the unlabeled communication. However, because different features of the unlabeled communication may each have individual and different communication-category labels there may be different conflicting signals as to which label is correct for the unlabeled communication. For example, the sender email address may have the label "good" but the hash of a URL included in the email may be associated with the label bulk email. Thus two different features of the unlabeled communication suggest two different communications-category labels that may be assigned.

Voting may reduce instances of false positives because the effect of a single communications-category label such as spam may be reduced by other communication-category labels. The voting module 1324 may identify a single communications-category label with the highest confidence of being correct for the unlabeled communication. Confidence levels may be provided in part by the confidence module 1322. Voting may include increasing the confidence in a communications-category label based on the number of different sources that support the same label. Conversely, if a given entity such as a host server is associated with conflicting information that will reduce the confidence in any communications-category label applied to that entity.

One voting rule may be to remove both communications-category labels if there is a conflict. In this implementation, the conflicting communications-category labels would cancel each other out. A variation of this rule may be to keep the communications-category label associated with a highest confidence level and discard one or more other communications-category labels associated with lower confidence levels. The voting module 1324 may also implement rules that allow for multiple communications-category labels to be applied to the same communication. For example, some communications-category labels may be identified as not being in conflict with each other such as malware and phishing. Thus there may be communications such as emails, or feature entities such as IP addresses, that are simultaneously assigned to two or more different labels.

Other aspects of the voting rules may include discounting potential communications-category labels if the confidence in the label is below a threshold level and/or if the number of sources pointing to a given label is fewer than a threshold number. The discounting may consist of ignoring those communication-category labels or giving them less weight determining the communications-category label that will ultimately be assigned. Voting rules may also allow labels from some sources to overwrite labels from other sources. For example, communication-category labels provided by manual labeling 1316 may be allowed to overwrite and replace communications-category labels provided by other sources such as allowlist(s) 1312 or denylist(s) 1314. Additionally, newer sources may be allowed to overwrite older sources.

Various sources of communications-category labels provide information at different times. As situations change old information may be less reliable than newer information. For example, a host server that previously was used to send spam may have improved control over its users and eliminated the accounts of spammers. Thus, an older label indicating that the host server is a sources spam is no longer be accurate. Dates that communication-category labels are provided may be recorded and compared by the voting module 1324.

Another voting technique that may be implemented by the voting module 1324 is removal of minority voting. If there are two or more different communications-category labels that could potentially be applied to an entity the label with the smallest number of votes may be removed from consideration. If there only two communication-category labels identified for an entity, then minority voting simply removes the communication-category label with the fewest number of votes. However, if there are many signals indicating three or more different communications-category labels that may be correct for an entity, the voting module 1324 may remove the one with the fewest votes and proceed to apply other voting rules to the remaining communication-category labels.

A composite key module 1326 may combine two or more entity types to create a single key for clustering. A "key" for clustering is an entity type that can be assigned a communication-category label such as good, spam, bulk, phishing, malware, etc. As mentioned above, the entity types may be principal entities which are the communications themselves such as emails and clustering entities which represent features of the principle entities (e.g., sender email address, URL included in email, etc.). Thus, typically features of an email such as the hash of the contents of an email may be used as a key for forming a cluster. All emails that are associated with the same hash of the contents, meaning that the contents are identical or very similar, can be placed in the same cluster. Ultimately, the cluster may be assigned a communication-category label and that label may be applied to all of the entities in the cluster.

However, some types of keys may lead to false positives and return a label that is not correct. One way to reduce false positives is to make the keys more specific by combining multiple features into a single key—a composite key. For example, the IP address of the sender and the AuthInfo Code for the sending domain may be combined to form a composite key. The AuthInfo Code is an alphanumeric security code that exists for most top-level domains and is only known to the domain owner or administrative contact. Thus, instead of clustering based only on the IP address of the sender, the IP address and a single AuthInfo code are used as the key for a cluster. This may be appropriate if some of the emails coming from the IP address are good while others are spam and creating more specific clusters additionally based on the AuthInfo code is effective at separating the good email and the spam email into different clusters. Composite keys may be used in this way to avoid grouping emails with different communications-category labels in the same cluster.

The composite key module 1326 may create composite keys and new clusters in response to evaluation of existing clusters performed by other modules such the confidence module 1322 or the voting module 1324. For example, if the confidence module 1322 identifies clusters or specific entities in clusters that have confidence levels below a threshold level, that may trigger the composite key module 1326 to identify a composite key that can be used to create clusters with higher confidence levels. Similarly, if the voting module 1324 identifies clusters or entities with labels that remain ambiguous even after applying the voting rules, that may suggest that the two or more keys should be combined to create a composite key and generate new clusters.

The email classifier 114 introduced in FIG. 1 uses a MLM 116 developed from the training dataset 118. The training dataset 118 may be developed on a computing device 1302 that is separate from computing devices in the email system such as the email gateway 110 and the email server 112. The training dataset 118 is created by the labeling module 1310 applying labels to unlabeled communications without accessing confidential information or PII. The email classifier 114 may be implemented as any type of classifier such as a linear classifier, a support vector machine, a k-nearest neighbor, a decision tree, a neural network, etc. Email classifier 114 classifies emails, such as the email 104 shown in FIG. 1, into one or more of a number of predetermined categories such as good, spam, bulk, phishing, or malware.

The email classifier 114 uses a MLM 116 to identify a classification. The MLM 116 (e.g., a neural net or a naïve Bayes classifier) is trained on the training dataset 118 using a supervised learning method (e.g., booster decision trees, gradient descent, stochastic gradient descent). In some implementations, the training dataset 118 includes pairs of an input vector and a corresponding answer vector or scalar, which is commonly denoted as the target (e.g., one of the communication-classification labels). The current model is run with the training dataset 118 and produces a result, which is then compared with the target, for each input vector in the training dataset 118. Based on the result of the comparison and the specific learning technology being used, the parameters of the MLM are adjusted. The MLM fitting can include both variable selection and parameter estimation.

The email classifier 114 may automatically extract features from incoming email messages and input those feature values into the MLM 116. The MLM 116 then outputs a classification that may be used by an email system to process or route the email according to its label. For example, the email may be rejected based on the assigned label or the email may be routed to a specific email folder. Each email that is classified by the email classifier 114 can provide additional information for the labeling module 1310 to add to the training dataset 118. This creates feedback in which each email classified by the email classifier 114 may contribute to improving the training dataset 118. Incorporating this type of feedback into the training dataset 118 provides opportunities to react to evolving behaviors and techniques of malicious entities that send spam and other types of undesired communications.

As the training dataset 118 is improved through additional labeled examples it may be used to train a new MLM 116 that can form a new model based on the additional examples in the training dataset 118. Additionally, further labeled examples of emails may be obtained such as from manual labeling 1316 and updated allowlist(s) 1312 or denylist(s) 1314. Labeled examples included in the training dataset 118 may be retained so that the volume of the training dataset 118 continually increases. In some implementations, some of the labeled examples may be removed from the training dataset 118 after a period of time. For example, if a particular URL has not been associated with a phishing email for 30 days, then the labeled example associating that email with phishing may be removed from the training dataset 118. The period of time after which a particular cluster is "forgotten" or omitted from the current version of the training dataset 118 may vary based on the entity represented by the cluster. Thus, periodically the MLM 116 may be replaced with a new MLM 116. In some implementations, the training dataset 118 may be periodically finalized at intervals such as every day or every four days. Once finalized, a new MLM 116 is trained and used by the email classifier 114.

Figure 14:
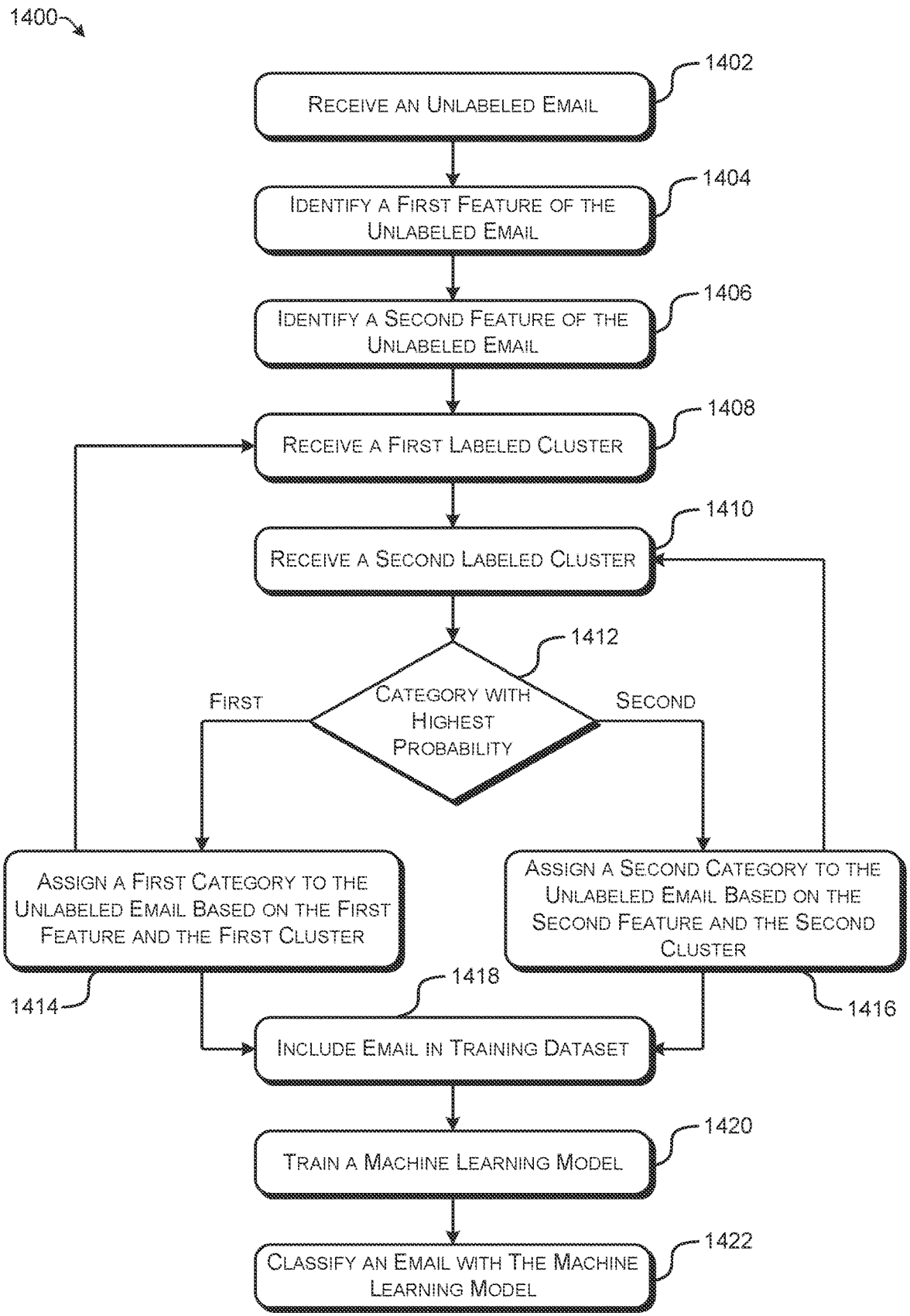
FIG. 14 is flow diagram of an illustrative process for labeling an email for inclusion in a training dataset to train a MLM.

FIG. 14 shows an illustrative process 1400 for labeling an unlabeled email to include in a training dataset. In an implementation, process 1400 may be implemented by the computing device 1302 shown in FIG. 13.

At 1402, an unlabeled email is received. The unlabeled email may be an email that is included in an enterprise email system for which confidentiality of the email content must be maintained and the analysis of the email must be performed without using PII.

In 1404, a first feature of the unlabeled email that does not include personalized identifiable information is identified. The first feature may be any of the email features discussed above such as a sender email address, a sender email host server, a timestamp, a character encoding, a URL included in the email, a hash of at least a portion of the email body, etc.

At 1406, a second feature of the unlabeled email that also does not include PII is identified. The second feature of the unlabeled email is different from the first feature of the unlabeled email. Thus, at least two features of the unlabeled email are identified.

At 1408, a first labeled cluster comprising an email-category label and seed data is received. For example, the first labeled cluster may be one of the clusters 702-708 shown in FIG. 7. The email-category label that is applied to the first labeled cluster may be any of the labels discussed above such as good, spam, phishing, bulk, or malware. The seed data, as discussed above, are features with labels that are used to start the cluster formation. The seed data may come from a previously labeled email, a denylist, an allowlist, a communication graph, or other source. The communication graph is a record of interactions between different email addresses that indicates the amount and nature of back-and-forth communication. A strong connection which may be represented by multiple edges in the communication graph can indicate that both of the email addresses are good senders for each other and emails from one to the other should be labeled as good emails.

At 1410, a second labeled cluster comprising a second email-category label and second seed data is received. The second labeled cluster may be similar to the first labeled cluster but associated with a different email-category label.

At 1412, it is determined which of the email-category labels has the highest probability of being correct for the unlabeled email. The probability may be based on the confidence level of the initial seed data and any confidence degrading ratios of edges in expansion graphs that are used to expand the email-category label from a cluster to the unlabeled email. The determination may also be made by applying a set of voting rules. As mentioned above, the voting rules may include removing both conflicting email-category labels, retaining an email-category label associated with the highest confidence level, determining that two different email-category labels are not conflicting and retaining both email-category labels, or retaining an email-category label associated with the most recent seed data.

If it is determined that the first email-category label has the highest probability of being correct, process 1400 proceeds along the "first" path to 1414. If it is determined that the second email-category label has the highest probability of being correct, process 1400 proceeds along the "second" path to 1416. The determination made at 1412 may, in some implementations, be made by the confidence module 1322 and/or the voting module 1324 shown in FIG. 13.

At 1414, the first email-category label is assigned to the unlabeled email based on the first feature and the first labeled cluster. For example, the first email-category label may be assigned to the unlabeled email because the first labeled feature belongs to the first labeled cluster. The assignment may include a confidence level representing the likelihood that the first email-category label is an accurate label for the first labeled cluster.

Once the first email-category label is applied to the unlabeled email, that email-category label may also be applied to the features of the unlabeled email and those features may be added to labeled clusters as represented by process 1400 proceeding from 1414 back to 1408. Thus, labeling the unlabeled email provides additional information that can be applied to the features of the unlabeled email and added to clusters in order to provide more data in the clusters. The labeling module 1310 may assign the email-category label to the unlabeled email.

At 1416, if this is the path followed from the decision point at 1412, the second email-category label is assigned to the unlabeled email based on the second feature in the second labeled cluster. As with 1414, assigning an email-category label to the unlabeled email may provide feedback that can contribute to the cluster at 1410. Thus, labeling an unlabeled email can additionally provide labeled email features which are added to existing clusters. The labeling module 1310 may assign the email-category label to the unlabeled email.

At either 1414 or 1416, labeling the unlabeled email creates a labeled email. This label may be associated with the email based on features of the email that do not contain PII. Thus, process 1400 provides a technique for labeling an email without direct examination of the email contents.

At 1418, the labeled email is included in a training dataset. This may be the training dataset 118 introduced in FIG. 1. The training dataset may include a large number of emails and associated email-category labels. Thus, process 1400 may be repeated hundreds or thousands of times to generate a training dataset with a large number of labeled examples.

At 1420, a MLM is trained using the training dataset. This may be the MLM 116 introduced in FIG. 1.

At 1422, a received email is classified with the MLM. The received email is an email that has come into an email system which uses the MLM to classify emails. For example, the email may be the email 104 shown in FIG. 1. The classification may be performed by the email classifier 114.

Figure 15:
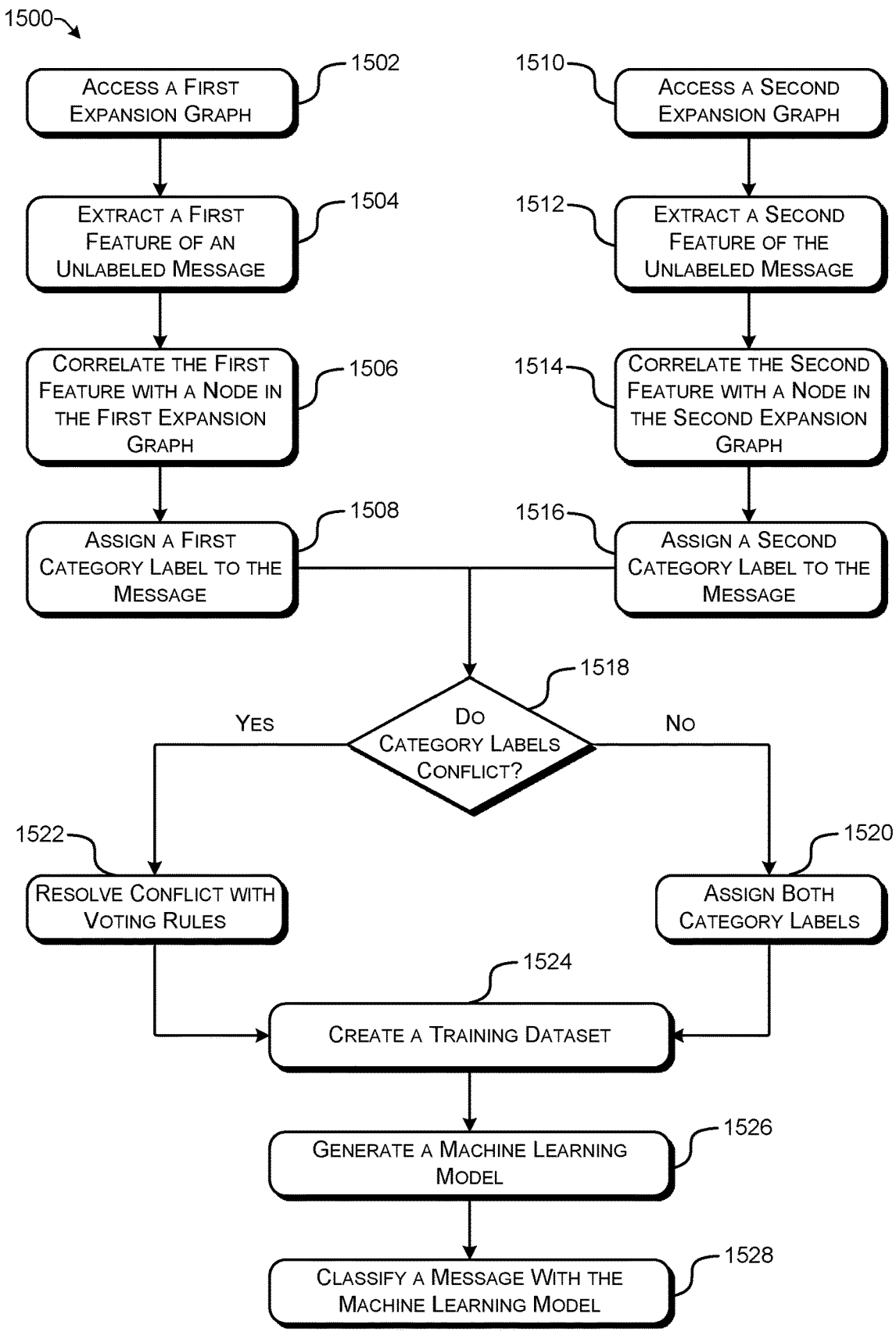
FIG. 15 is a flow diagram of an illustrative process for creating a training dataset in order to generate a MLM.

FIG. 15 shows an illustrative process 1500 for using expansion graphs to assign labels to messages and creating a training dataset. In an implementation, process 1500 may be implemented by the computing device 1302 shown in FIG. 13.

At 1502, a first expansion graph of relationships between a message node and a plurality of feature nodes may be accessed. The expansion graph may be any of the expansion graphs shown in FIGS. 9-12 or the expansion graph(s) 1318 shown in FIG. 13. The feature nodes correspond to features of the message that do not include PII. For example, the feature nodes may be a message hash node ("fingerprint"), a message sender (email address) node, a URL node, and a sender host node. In an implementation, the expansion graph may include at least two feature nodes. The first expansion graph is associated with a category label such as good message, spam message, phishing message, bulk message, or malware message.

At 1504, a first feature is extracted from an unlabeled message. The first feature may be any feature that does not include PII and is associated with the message such as one of the email features 402 shown in FIG. 4.

At 1506, the first feature is correlated with a node in the first expansion graph. For example, if the first feature is the sender's email address, then this feature is correlated with a node in the expression graph for sender's email address such as the nodes 908, 1108, and 1208 shown in FIGS. 9, 11, and 12.

At 1508, the category label associated with the first expansion graph is assigned to the unlabeled message based on a directional edge connecting the feature node to the message node. This type of directional edge is referred to previously as a clustering edge and illustrated by dotted lines in FIGS. 9-12. The directional edge may be associated with a probability such as a confidence degrading ratio and assigning the category label to the unlabeled message may be based on the probability. For example, the unlabeled message may be assigned a 70% probability of being spam. This may be performed in part by the expansion module 1320.

Steps 1510-1516 represent a second pathway for assigning a second category label to the message based on a second expansion graph that is different from the first expansion graph and a second feature extracted from the unlabeled message. Thus, a different feature of the unlabeled message may correlate with a different node in a different expansion graph and lead to assignment of a different category label to the same unlabeled message. For example, the email sender address may indicate that the unlabeled message is spam while the hash of the email contents indicate that it is bulk email.

At 1518, is determined if the first category label assigned at 1508 and the second category label assigned at 1516 conflict. Recall that some category labels do not necessarily conflict such as spam and bulk email. If the two different category labels do not conflict, then process 1500 proceeds along the "no" path to 1520.

At 1520, both category labels are assigned to the unlabeled message creating a labeled message. This step may be performed by the labeling module 1310 in the computing device 1302.

If however, the category labels are determined to conflict, then process 1500 proceeds along the "yes" path to 1522. At 1522, a set of voting rules is applied to resolve the conflict between the first category label and the second category label. The set of voting rules specifies priority between conflicting category labels. Any number of different voting rules may be used such as giving priority to the category label with the highest confidence level, giving priority to the category label based on the most recent data, selecting the category label that has the most number of different sources supporting that label, rejecting category labels that are supported by conflicting information, giving priority to a category label based on the source of the label (e.g., human-verified category labels are given priority over machine-assigned labels), etc. The voting rules may be implemented by the voting module 1324. The category label that is ultimately selected following application of the set of voting rules may be assigned to the unlabeled communication by the labeling module 1310.

At 1524, a training dataset that comprises the labeled communication is created. This may be the training dataset 118. The training dataset likely includes a large number of labeled communications, not just this single communication. Thus, process 1500 may be repeated a large number of times to generate a training dataset with many labeled communications in it.

At 1526, a MLM is generated. This may be any type of MLM generated from a training dataset through supervised learning such as the MLM 116 shown in FIGS. 1 and 13.

At 1528, a new message is classified with the MLM. This is distinct from labeling the unlabeled message for inclusion in the training dataset. Classification by the MLM is an operation performed by email system that processes the new message differently based on its classification. For example, the new message may be the email 104 shown in FIG. 1 and the processing may include routing the email 104 to a particular folder such as one of the folders 122-130 shown in FIG. 1 or placing the email 104 into the trash 132.

ILLUSTRATIVE EMBODIMENTS

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A method of labeling email, the method comprising:
receiving an unlabeled email;
identifying a feature of the unlabeled email that does not include personally identifiable information (PII);
receiving a labeled cluster comprising an email-category label and seed data;
assigning the email-category label to the unlabeled email based on the feature and the labeled cluster thereby creating a labeled email;
including the labeled email in a training dataset;
training a machine learning model to classify email with the training dataset; and
classifying a received email with the machine learning model.

Clause 2. The method of clause 1, wherein the feature comprises sender email address, sender email host server, timestamp, a universal resource locator (URL) included in the email, or a hash of at least a portion of a body of the unlabeled email.

Clause 3. The method of clause 1, wherein the email-category label is good email, spam email, phishing email, bulk email, or malware email and further comprising: moving the received email to a folder or deleting the received email based on the email-category label.

Clause 4. The method of clause 1, 2, or 3, wherein the seed data comprise a previously labeled email, a denylist, an allowlist, or a communication graph.

Clause 5. The method of clause 1, 2, 3, or 4, wherein the assigning the email-category label is based on the feature belonging to the labeled cluster.

Clause 6. The method of clause 5, wherein there is a confidence level representing a likelihood that the email-category label is an accurate label for the labeled cluster.

Clause 7. The method of any of clauses 1-6, further comprising:
identifying a second feature of the unlabeled email that does not include personally identifiable information (PII);
receiving a second labeled cluster comprising a second email-category label and second seed data;
assigning the second email-category label to the unlabeled email based on the second feature and the second labeled cluster; and
determining that the email-category label has a higher probability of being correct than the second email-category label by applying a set of voting rules.

Clause 8. The method of clause 7, wherein the set of voting rules includes one or more rules for: removing both conflicting email-category labels, retaining an email-category label associated with a highest confidence level, determining that two different email-category labels are not conflicting and retaining both email-category labels, or retaining an email-category label associated with most recent seed data.

Clause 9. Computer readable media comprising instructions that when executed cause a computing device to implement the method of any of clauses 1-8.

Clause 10. A system comprising one or more processing units and one or more memory units, the one or more memory units comprising instructions that when executed by the one or more processing units implement the method of any of clauses 1-8.

Clause 11. A system comprising:
one or more processing units;
one or more memory units coupled to the one or more processing units;
an expansion graph, stored in the one or more memory units, that is associated with a communications-category label and comprises a feature entity connected by a directional edge to a clustering entity that represents a feature of a communication other than personally identifiable information (PII); and a labeling module, stored in the one or more memory units, that assigns the communications-category label to an unlabeled communication based on a first feature of the unlabeled communication and the expansion graph, thereby creating a labeled communication.

Clause 12. The system of clause 11, wherein the communications-category label is good, spam, phishing, bulk, or malware and further comprising: processing the labeled communication by storing the labeled communication or deleting the labeled communication based on the communications-category label.

Clause 13. The system of clause 11 or 12, further comprising an expansion module, stored in the one or more memory units, configured to assign the communications-category label to a second feature of the unlabeled communication based on the expansion graph.

Clause 14. The system of clause 11, 12, or 13, further comprising a confidence module, stored in the one or more memory units, configured to assign a probability to the communications-category label based on the expansion graph.

Clause 15. The system of clause 11, 12, 13, or 14, further comprising a voting module, stored in the one or more memory units, configured to apply a set of voting rules to resolve conflicts between the communications-category label assigned to the unlabeled communication based on the first feature and a second communications-category label also assigned to the unlabeled communication based on a second feature.

Clause 16. The system of any of clauses 11-15, further comprising a composite key module, stored in the one or more memory units, configured to generate a cluster based on two or more features.

Clause 17. The system of any of clauses 11-16, wherein the system comprises an email gateway.

Clause 18. The system of any of clauses 11-16, wherein the system comprises an email server.

Clause 19. A method comprising;

accessing an expansion graph of relationships between a message node and a plurality of feature nodes, the plurality of feature nodes corresponding to features that do not include personally identifiable information (PII), the expansion graph associated with a first category label;

extracting a feature from an unlabeled message;

correlating the feature with a one of the plurality of feature nodes in the expansion graph;

assigning the first category label to the unlabeled message based on a directional edge in the expansion graph from the feature node to the message node, thereby creating a labeled message;

creating a training dataset comprising the labeled message;

generating a machine learning model by supervised learning using the training dataset; and classifying a new message with the machine learning model.

Clause 20. The method of clause 19, wherein the category label comprises one or more of good message, spam message, phishing message, bulk message, or malware message and further comprising: processing the new message according to the first category label, the processing comprising storing, quarantining, or deleting.

Clause 21. The method of clause 19 or 20, wherein the plurality of feature nodes comprise at least two of a message hash node, a message sender node, a URL node, or a sender host node.

Clause 22. The method of clause 19, 20, or 21, wherein the directional edge is associated with a probability and assigning the category label is based on the probability.

Clause 23. The method of any of clauses 19-22, further comprising assigning a second category label to the unlabeled message based on a second expansion graph and a second feature of the unlabeled message.

Clause 24. The method of clause 23, further comprising resolving a conflict between the first category label and the second category label based on a set of voting rules that specify priority between conflicting category labels.

Clause 25. Computer readable media comprising instructions that when executed cause a computing device to implement the method of any of clauses 19-24.

Clause 26. A system comprising one or more processing units and one or more memory units, the one or more memory units comprising instructions that when executed by the one or more processing units implement the method of any of clauses 19-24.

CONCLUSION

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process, or an alternate process. Moreover, it is also possible that one or more of the provided operations is modified or omitted.

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural, unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

The invention claimed is:

1. A method of labeling email, the method comprising:
receiving an unlabeled email;
identifying a feature and a second feature of the unlabeled email, wherein the feature and the second feature do not include personally identifiable information ("PII") in a body of the unlabeled email;
receiving a labeled cluster comprising an email-category label and seed data;
assigning the email-category label to the unlabeled email based on a first derivative edge in an expansion graph thereby creating a labeled email, wherein the first derivative edge is a directional edge from the labeled cluster to the feature and the first derivative edge represents first inference logic that the email-category label associated with the labeled cluster is also associated with the unlabeled email;
including the labeled email in a training dataset;
assigning the email-category label to the second feature based on a clustering edge in the expansion graph, wherein the clustering edge is a directional edge from the feature to the second feature and the clustering edge represents second inference logic that a label associated with the feature is also associated with the second feature;
assigning the email-category label to a second unlabeled email based on a second derivative edge in the expansion graph thereby creating a second labeled email, wherein the second derivative edge is a directional edge from the second feature to the second unlabeled email and the second derivative edge represents third inference logic that the email-category label associated with the second feature is also associated with the second unlabeled email;
including the second labeled email in the training dataset;
training a machine learning model to classify email with the training dataset; and
classifying a received email with the machine learning model as spam; and
quarantining the received email on a server without downloading to a local computer.

2. The method of claim 1, wherein the feature comprises sender email address, sender email host server, timestamp, a universal resource locator included in the email, or a hash of at least a portion of the body of the unlabeled email.

3. The method of claim 1, wherein the email-category label is good email, spam email, phishing email, bulk email, or malware email and the method further comprises: moving the received email to a folder or deleting the received email based on the email-category label.

4. The method of claim 1, wherein the seed data comprise a previously labeled email, a denylist, an allowlist, or a communication graph.

5. The method of claim 1, wherein the assigning the email-category label is based on the feature belonging to the labeled cluster.

6. The method of claim 5, wherein there is a confidence level representing a likelihood that the email-category label is an accurate label for the labeled cluster.

7. The method of claim 1, further comprising:
identifying a third feature of the unlabeled email;
receiving a second labeled cluster comprising a second email-category label and second seed data;
assigning the second email-category label to the unlabeled email based on the third feature and the second labeled cluster; and
determining that the email-category label has a higher probability of being correct than the second email-category label by applying a set of voting rules.

8. The method of claim 7, wherein the set of voting rules includes one or more rules for: removing both conflicting email-category labels, retaining an email-category label associated with a highest confidence level, determining that two different email-category labels are not conflicting and retaining both email-category labels, or retaining an email-category label associated with most recent seed data.

9. Computer-readable storage media comprising instructions that when executed cause a computing device to:
identify a feature and a second feature of an unlabeled email, wherein the feature and the second feature do not include personally identifiable information ("PII") in a body of the unlabeled email;
receive a labeled cluster comprising an email-category label and seed data;
assign the email-category label to the unlabeled email based on a derivative edge in an expansion graph thereby creating a labeled email,
wherein the derivative edge is a directional edge from the labeled cluster to the feature of the unlabeled email and the derivative edge represents first inference logic that the email-category label associated with the labeled cluster is also associated with the unlabeled email;
include the labeled email in a training dataset;
assign the email-category label to a second unlabeled email based on a clustering edge in the expansion graph thereby creating a second labeled email,
wherein the clustering edge is a directional edge from the feature to the second feature and the clustering edge represents second inference logic that a label associated with the feature is also associated with the second feature;
include the second labeled email in the training dataset;
train a machine learning model to classify email with the training dataset; and
classify a received email with the machine learning model as spam; and
quarantine the received email on a server without downloading to a local computer.

10. The computer-readable storage media of claim 9, wherein the feature comprises sender email address, sender email host server, timestamp, a universal resource locator included in the email, or a hash of at least a portion of the body of the unlabeled email;
wherein the email-category label is good email, spam email, phishing email, bulk email, or malware email and the instructions when executed further cause the computing device to: move the received email to a folder or delete the received email based on the email-category label; and wherein the seed data comprise a previously labeled email, a denylist, an allowlist, or a communication graph.

11. The computer-readable storage media of claim 9, wherein the instructions further cause the computing device to:
identify a third feature of the unlabeled email;
receive a second labeled cluster comprising a second email-category label and second seed data;
assign the second email-category label to the unlabeled email based on the third feature and the second labeled cluster; and determine that the email-category label has a higher probability of being correct than the second email-category label by applying a set of voting rules.

12. The computer-readable storage media of claim 11, wherein the set of voting rules includes one or more rules for: removing both conflicting email-category labels, retaining an email-category label associated with a highest confidence level, determining that two different email-category labels are not conflicting and retaining both email-category labels, or retaining an email-category label associated with most recent seed data.

13. The computer-readable storage media of claim 9, wherein the feature comprises a hash of at least a portion of the body of the unlabeled email and wherein the instructions further cause the computing device to generate the hash from at least a portion of the body of the unlabeled email by applying a hashing algorithm.

14. A system comprising:
one or more processing units;
one or more memory units coupled to the one or more processing units, the one or more memory units containing instructions that when executed by the one or more processing units cause the system to:
assign an email-category label to an unlabeled email based on a directional, derivative edge to a feature of the unlabeled email from a labeled cluster comprising an email-category label and seed data thereby creating a labeled email, wherein the feature does not include personally identifiable information ("PII") from a body of the unlabeled email;
assign the email-category label to a second feature of the unlabeled email based on a directional, clustering edge from the unlabeled email to the second feature;
classify email by use of a machine learning model trained on a training dataset that includes the labeled email; and
classify a received email with the machine learning model as spam; and
quarantine the received email on a server without downloading to a local computer.

15. The system of claim 14, wherein the feature comprises sender email address, sender email host server, timestamp, a universal resource locator included in the unlabeled email, or a hash of at least a portion of the body of the unlabeled email;
wherein the email-category label is good email, spam email, phishing email, bulk email, or malware email and the system is further configured to: move the received email to a folder or delete the received email based on the email-category label; and
wherein the seed data comprise a previously labeled email, a denylist, an allowlist, or a communication graph.

16. The system of claim 14, wherein the email-category label is assigned based on the feature belonging to the labeled cluster.

17. The system of claim 16, wherein the instructions further cause the system to assign a confidence level representing a likelihood that the email-category label is an accurate label for the labeled cluster.

18. The system of claim 14, wherein the instructions further cause the system to assign a second email-category label to the unlabeled email based on a second feature of the unlabeled email and a second labeled cluster comprising a second email-category label and second seed data thereby creating a labeled email labeled with the email-category label and the second email-category label; and
the instructions further cause the system to determine that the email-category label has a higher probability of being correct than the second email-category label by applying a set of voting rules.

19. The system of claim 18, wherein the set of voting rules includes one or more rules for: removing both conflicting email-category labels, retaining an email-category label associated with a highest confidence level, determining that two different email-category labels are not conflicting and retaining both email-category labels, or retaining an email-category label associated with most recent seed data.

* * * * *